United States Patent
Tachino et al.

(10) Patent No.: US 7,759,624 B2
(45) Date of Patent: Jul. 20, 2010

(54) IMAGE DATA GENERATING DEVICE AND LIGHT RECEIVING DEVICE

(75) Inventors: Yoshihide Tachino, Kariya (JP); Ryouichi Sugawara, Nagoya (JP)

(73) Assignee: DENSO CORPORATION, Kariya (JP)

( * ) Notice: Subject to any disclaimer, the term of this patent is extended or adjusted under 35 U.S.C. 154(b) by 93 days.

(21) Appl. No.: 12/004,473

(22) Filed: Dec. 21, 2007

(65) Prior Publication Data
US 2008/0157012 A1 Jul. 3, 2008

(30) Foreign Application Priority Data
Dec. 28, 2006 (JP) ............... 2006-354669

(51) Int. Cl.
- H01L 27/00 (2006.01)
- G01N 21/86 (2006.01)
- G01C 3/08 (2006.01)
- H04N 5/222 (2006.01)

(52) U.S. Cl. ............... 250/208.1; 250/559.19; 356/4.03; 348/333.12

(58) Field of Classification Search ............ 250/208.1, 250/214 R, 214.1, 552, 559.19, 559.26, 559.38, 250/206.1, 206.2; 348/294, 300–302, 308, 348/309; 257/203–208, 215, 226, 238–239, 257/242, 282, 287, 315, 322, 387; 356/3.06, 356/3.08, 4.01, 4.03, 4.07, 28, 139.01, 603, 356/606, 622; 382/106, 118, 154
See application file for complete search history.

(56) References Cited

U.S. PATENT DOCUMENTS

| | | | |
|---|---|---|---|
| 6,466,266 B1* | 10/2002 | Guidash et al. | 348/308 |
| 6,825,455 B1 | 11/2004 | Schwarte | |
| 6,906,302 B2 | 6/2005 | Drowley | |
| 7,053,357 B2 | 5/2006 | Schwarte | |
| 2008/0291310 A1* | 11/2008 | Ladd et al. | 348/308 |

* cited by examiner

Primary Examiner—Georgia Y Epps
Assistant Examiner—Don Williams
(74) Attorney, Agent, or Firm—Posz Law Group, PLC

(57) ABSTRACT

An image data generating device has a photoelectric sensor including an array of pixel generating units, each of which has one photoelectric conversion element and one floating diffusion. The photoelectric sensor includes a matrix of pixel sets, each of which includes a matrix of pixel generating units on two rows and two columns. To generate plane image data, the image data generating device finds a pixel value on a pixel basis from an output value for each pixel generating unit. To generate distance image data, the image data generating device finds a distance to a subject for each pixel set from an output value for each pixel generating unit belonging to the pixel set and calculates a pixel value per pixel set.

16 Claims, 18 Drawing Sheets

US 7,759,624 B2

IMAGE DATA GENERATING DEVICE AND LIGHT RECEIVING DEVICE

CROSS REFERENCE TO RELATED APPLICATION

This application is based on and incorporates herein by reference Japanese Patent Application No. 2006-354669 filed on Dec. 28, 2006.

FIELD OF THE INVENTION

The present invention relates to an image data generating device for generating plane image data representing a plane image of a subject and distance image data representing a distance to the subject and a light receiving device appropriate to the image data generating device.

BACKGROUND OF THE INVENTION

A known image data generating device receives light from a subject through a light receiving device, which includes an array of photoelectric conversion elements, and detects the amount of light received from the subject for each photoelectric conversion element. The image data generating device arranges pixel values corresponding to the amounts of light received to generate plane image data representing the subject's plane image. Another known image data generating device generates distance image data by arranging a pixel value corresponding to the distance to a subject.

A known image data generating device for generating distance image data allows a light emitting device to emit light to a subject. One emission operation is accompanied by multiple light receiving operations during different periods. The light receiving operations cause the amounts of light received during different periods. Based on the amounts of light received, the image data generating device detects a phase difference between the light emitted to the subject and the light reflected from the subject to calculate a distance to the subject (e.g., see Patent Document 1).

Patent Document 1: JP-A-2006-516324 T (U.S. Pat. No. 6,906,302 B2)

A known light receiving device mounted on such an image data generating device uses a CMOS circuit for generating a signal corresponding to a charge generated by the photoelectric conversion element.

Another known light receiving device is provided in the form of a combination of a CCD circuit and a CMOS circuit as its peripheral circuit. The CMOS technology is not suited for CCD circuits although the technology is indispensable to formation of peripheral circuits such as an ADC (analog/digital) circuit. The light receiving device using the CCD circuit requires an interface circuit or a companion chip between the CCD circuit and the peripheral circuit, complicating a manufacturing process. In addition, the CCD circuit consumes large power for driving.

Instead of the CCD circuit, the CMOS circuit can be used to extract a charge from a photoelectric conversion element and output a signal equivalent to the charge. This makes it possible to prevent a manufacturing process from being complicated and manufacture an economical, low-power consumption light receiving device. A distance image data device using the CMOS circuit has recently become widespread.

The light receiving device needed to generate distance image data can also generate general plane image data. A recently developed light receiving device has functions of not only generating distance image data but also generating plane image data.

As described in Patent Document 1, the known distance image data generating device provides a pair of floating diffusions for a photoelectric conversion element to detect a phase difference between emitted light and reflected light. Reverse phases are applied to a period of accumulating charge using a first floating diffusion and a period of accumulating charge using a second floating diffusion. After the light emitting device emits light, the first floating diffusion accumulates a charge generated by the photoelectric conversion element during the first period. The second floating diffusion accumulates a charge generated by the photoelectric conversion element during the second period.

This operation is repeated to allow the floating diffusions to respectively accumulate charges corresponding to the light incident on the photoelectric conversion element during different periods. Charges accumulated in the floating diffusions are converted into voltage values as output values. The output values are used to detect a phase difference between the emitted light and the reflected light and find a distance to the subject.

Thus, such a technique constructs and controls the light receiving device as mentioned above to find a distance to the subject. In contrast, when the technique uses the light receiving device to generate plane image data, however, a resolution of plane image data is limited to that of distance image data.

The above-mentioned technique provides one photoelectric conversion element with multiple floating diffusions. In addition, the photoelectric conversion element needs to be surrounded by sets of output circuits including transistors for charge transfer and output transistors for generating a voltage value corresponding to a charge accumulated in the floating diffusion. It is difficult to narrow an interval for laying out the photoelectric conversion element. When the common light receiving device is used to generate distance image and plane image data, the resolution for plane image data is therefore limited to be low.

Conventionally, the image data generating device may have functions of generating both distance image data and plane image data and use the common light receiving device. In such a case, it has been difficult to maintain a resolution of plane image data to be equivalent to that of a dedicated plane image data generating device.

SUMMARY OF THE INVENTION

The present invention has been made in consideration of the foregoing. It is therefore an object of the invention to provide a technology capable of generating plane image data at a higher resolution than before using a common light receiving device without using a dedicated light receiving device for plane image data when an image data generating device has functions of generating both distance image data and plane image data.

As an example of the present invention, an image data generating device is provided as follows. A light emitting device is configured to emit light. A light receiving device is configured to receive incident light including the emitted light, which is reflected on a subject. A distance image data generation unit is configured to find a distance to the subject by controlling the light emitting device and the light receiving device and generate distance image data representing the distance. A plane image data generation unit is configured to control the light receiving device and generate plane image data representing a plane image of the subject. An operation control unit is configured to selectively operate the distance image data generation unit and the plane image data generation unit. Here, the light receiving device includes an array of a plurality of pixel generating units. Each of the pixel generating units includes a single photoelectric conversion section for converting incident light into a charge and a single pixel output section corresponding one-to-one with the photoelectric conversion section. The pixel output section has a floating diffusion for accumulating a charge generated by the photoelectric conversion section. The pixel output section is (i) for discharging and discarding the generated charge in accordance with a discharge instruction signal supplied from an outside, (ii) for transferring the generated charge to the floating diffusion in accordance with a charge transfer instruction signal supplied from the outside, and (iii) for outputting a value equivalent to a charge accumulated in the floating diffusion. The distance image data generation unit is further configured (i) to group the plurality of pixel generating units into multiple first sets of pixel generating units, (ii) to calculate a distance to the subject with respect to each first set of pixel generating units based on output values for the pixel generating units included in the each first set, and (iii) to represent a value corresponding to the calculated distance as a pixel value for a coordinate corresponding to the each first set of pixel generating units and generate the distance image data. The plane image data generation unit is further configured to describe a value corresponding to an output value for each of the pixel generating units as a pixel value for a coordinate corresponding to the each of the pixel generating units and generate the image data representing a plane image of the subject.

As another example of the present invention, a light receiving device is provided as being the light receiving device included in the above image data generating device.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Embodiments of the present invention will be described in further detail with reference to the accompanying drawings. The image data generating device 1 or 100 to be described generates distance image data representing a distance to a subject 5 or plane image data representing a plane image of the subject 5. For example, the image data generating device may be connected to a monitoring device for detecting an intruder or an onboard device for detecting an obstacle ahead of a vehicle. Image data generated and output from the image data generating device 1 or 100 is used to detect an intruder or an obstacle.

First Embodiment

Figure 1:
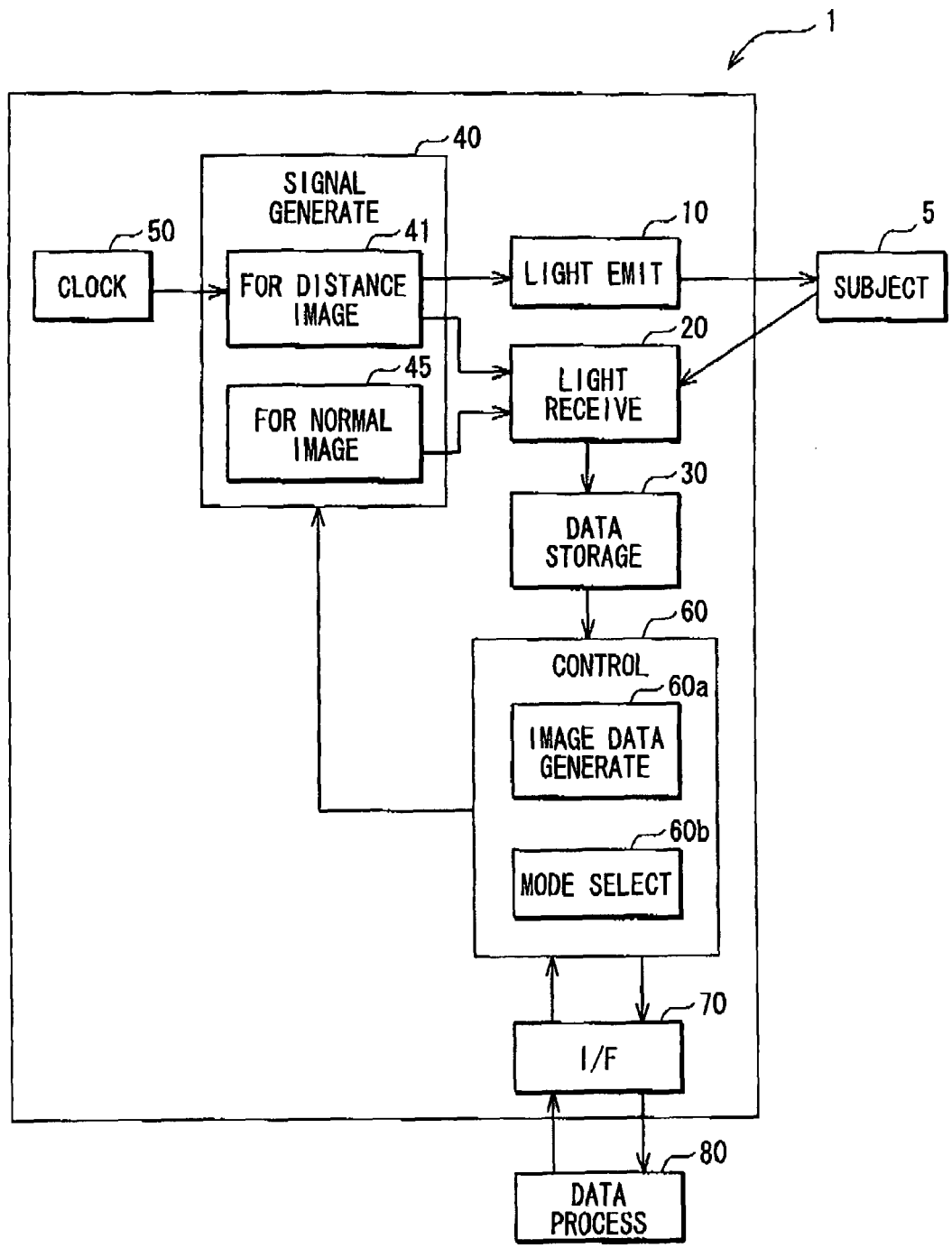
FIG. 1 is a block diagram showing a construction of an image data generating device according to a first embodiment.

FIG. 1 is a block diagram showing a construction of the image data generating device 1 according to a first embodiment. As shown in FIG. 1, the image data generating device 1 includes a light emitting section 10, a light receiving section 20, an output data storage section 30, a signal generating section 40, a clock signal generating section 50, a control section 60, and an interface section 70.

Specifically, the light emitting section 10 includes a light emitting diode, a drive circuit, and a diffusing lens. The light emitting diode emits near infrared rays. The drive circuit drives the light emitting diode in accordance with a light emitting signal FL. The diffusing lens diffuses the light emitted from the light emitting diode and radiates the light to the subject 5 in a specified measurement area. The light receiving section 20 includes a photoelectric sensor 21 and a condensing lens. The photoelectric sensor 21 outputs a value corresponding to the amount of light received. The condensing lens collects the light from the measurement area and supplies the light to the photoelectric sensor 21. An output value from the photoelectric sensor 21 is stored in the output data storage section 30.

The control section 60 includes a CPU, ROM, and RAM. The control section 60 allows the CPU to perform computation processes in accordance with a program recorded in the ROM, providing various functions in terms of the software. Specifically, the control section generates distance image data and plane image data. An image data generation and output function 60*a* outputs the generated data to an external data processing device 80 via the interface section 70. A mode selection function 60*b* selects operation mode in accordance with an instruction signal supplied from the external data processing device 80 via the interface section 70. The control section 60 provides these functions using programs. The external data processing device 80 connected to the interface section 70 can include the onboard device or the monitoring device as mentioned above.

The signal generating section 40 generates various instruction signals for the light emitting section 10 and the light receiving section 20 based on clock signals supplied from the clock signal generating section 50. The signal generating section 40 supplies the generated signals to the light emitting section 10 and the light receiving section 20. Specifically, the signal generating section 40 includes a distance image generation signal output section 41 and a normal image generation signal output section 45. The distance image generation signal output section 41 generates instruction signals needed to generate distance image data and supplies the signals to the light emitting section 10 and the light receiving section 20. The normal image generation signal output section 45 generates instruction signals needed to generate plane image data and supplies the signals to the light receiving section 20.

Figure 2:
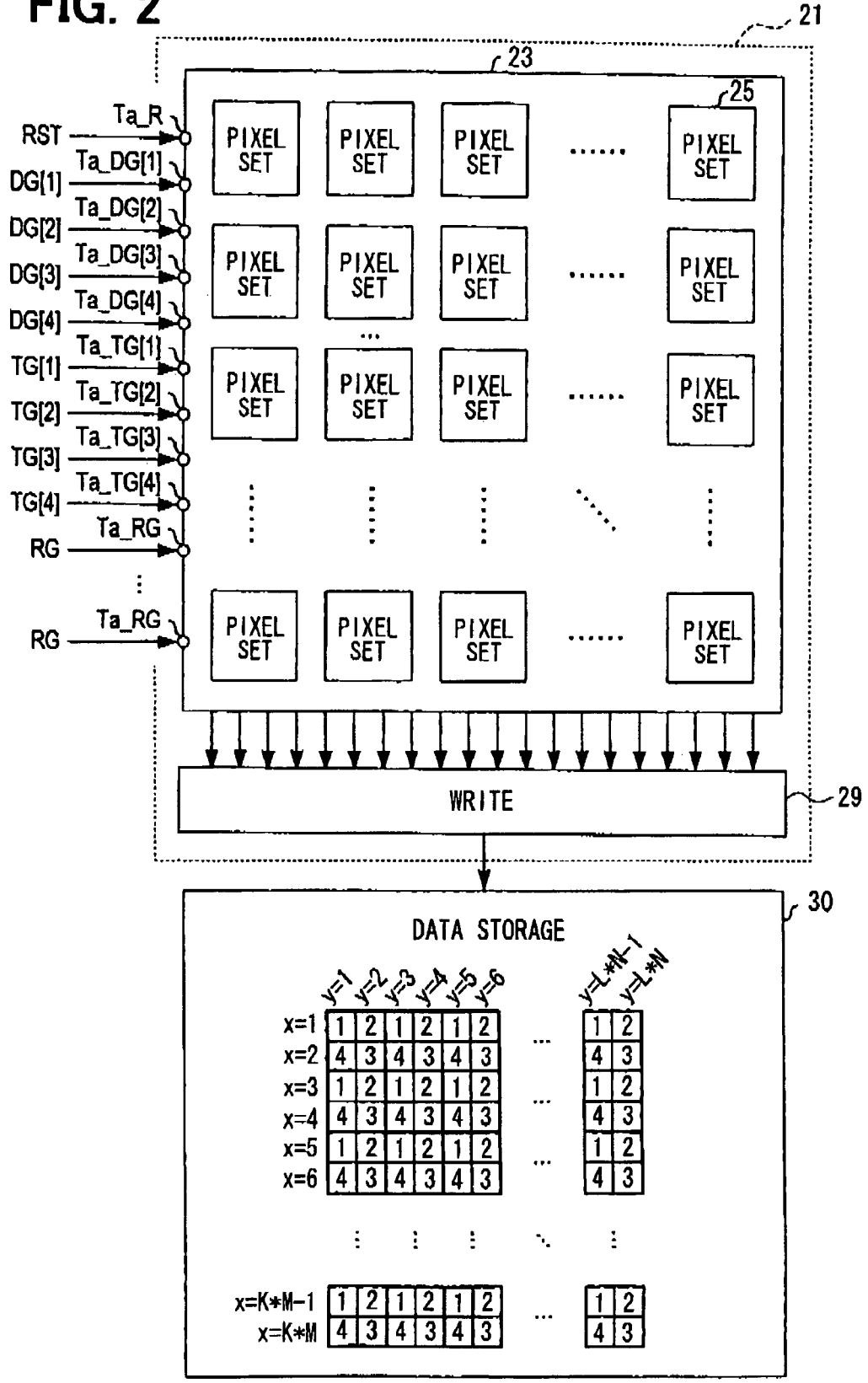
FIG. 2 is a block diagram showing a construction of a photoelectric sensor included in a light receiving section according to the first embodiment.
Figure 3:
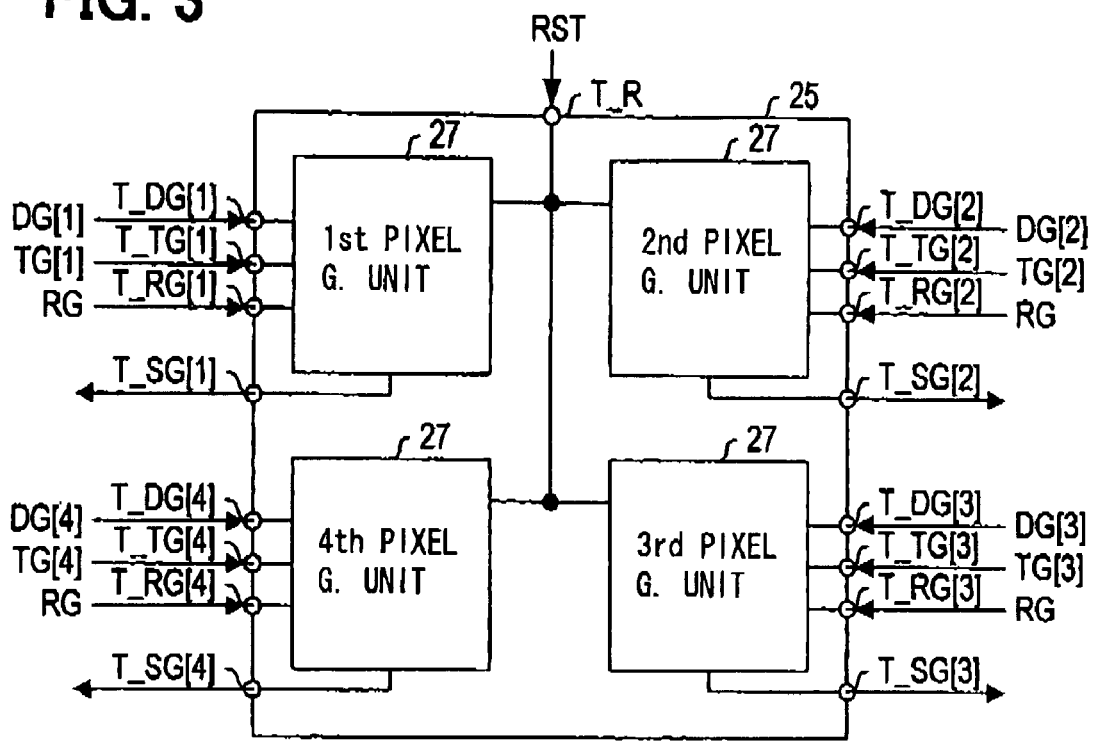
FIG. 3 is a block diagram showing a construction of a pixel set arranged on the photoelectric sensor according to the first embodiment.

The following describes the construction of the photoelectric sensor 21 included in the light receiving section 20 with reference to FIGS. 2 through 5. FIG. 2 is a block diagram showing the construction of the photoelectric sensor 21. FIG. 3 is a block diagram showing the construction of a pixel set 25 arranged on the photoelectric sensor 21.

As shown in FIG. 2, the photoelectric sensor 21 according to the invention includes a pixel array 23 and a writing section 29. The pixel array 23 contains multiple pixel sets 25 in a matrix of K rows by L columns. The writing section 29 A/D-converts an output value from each pixel generating unit 27 included in the pixel set 25 and writes the converted output value to a storage area in the output data storage section 30. The pixel generating unit 27 corresponds one-to-one with the storage area.

Figure 4:
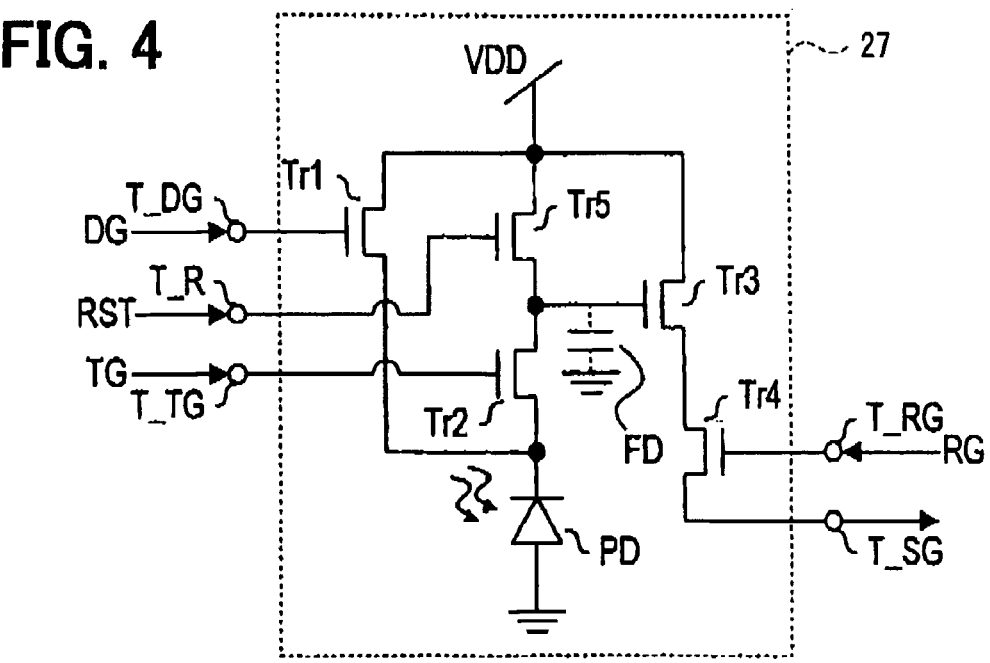
FIG. 4 is a circuit diagram showing a construction of a pixel generating unit included in the pixel set according to the first embodiment.

Each pixel set 25 in the pixel array 23 includes pixel generating units 27 in a matrix of two rows by two columns. A total of four pixel generating units 27 are provided. Each pixel generating unit 27 included in the pixel set 25 has a circuit construction as shown in FIG. 4. FIG. 4 is a circuit diagram showing the construction of the pixel generating unit 27.

As shown in FIG. 4, each pixel generating unit 27 in the pixel set 25 includes a photoelectric conversion element (i.e., photodiode) PD for generating a charge equivalent to an intensity of received light, a discharge transistor Tr1, a charge transfer transistor Tr2, a source follower transistor Tr3, an output transistor Tr4, a reset transistor Tr5, and a floating diffusion FD.

Specifically, the photoelectric conversion element PD of the pixel generating unit 27 is connected to source electrodes of the discharge transistor Tr1 and the charge transfer transistor Tr2. A drain electrode of the discharge transistor Tr1 is connected to a power supply VDD. A drain electrode of the charge transfer transistor Tr2 is connected to a source electrode of the reset transistor Tr5 and a gate electrode of the source follower transistor Tr3. A drain electrode of the reset transistor Tr5 and a drain electrode of the source follower transistor Tr3 are connected to the power supply VDD. A source electrode of the source follower transistor Tr3 is connected to a drain electrode of the output transistor Tr4. A source electrode of the output transistor Tr4 is connected to the writing section 29 via a signal line. In the pixel generating unit 27, the floating diffusion FD is provided for a signal line connecting the gate electrode of the source follower transistor Tr3 with the drain electrode of the charge transfer transistor Tr2.

The discharge transistor Tr1 included in the pixel generating unit 27 discharges a charge generated by the photoelectric conversion element PD in accordance with a discharge instruction signal DG supplied from the gate electrode and initializes the photoelectric conversion element PD. The charge transfer transistor Tr2 transfers a charge generated by the photoelectric conversion element PD to the floating diffusion FD in accordance with a charge transfer instruction signal TG supplied from the gate electrode.

The reset transistor Tr5 discharges a charge stored in the floating diffusion FD in accordance with a reset instruction signal RST supplied from the gate electrode and initializes the floating diffusion FD. That is, voltages at both ends of the floating diffusion FD are reset to initial voltages. The output transistor Tr4 allows the source follower transistor Tr3 to read a voltage value equivalent to a charge stored in the floating diffusion FD in accordance with an output instruction signal RG supplied from the gate electrode. The voltage value is input to the writing section 29. The source follower transistor Tr3 converts a charge stored in the floating diffusion FD into a voltage value.

Based on the above-mentioned construction, the pixel set 25 having four pixel generating units 27 is provided with an input electrode T_R for the reset instruction signal RST, and input electrodes T_DG, T_TG, and T_RG, and an output electrode T_SG for each pixel generating unit 27. A signal line extends from the input electrode T_R to the inside of the pixel set 25 and is connected with a gate electrode of the reset transistor Tr5 in each pixel generating unit 27.

A signal line extends from each input electrode T_DG provided for each pixel generating unit 27 to the inside of the pixel set 25 and is connected with a gate electrode of the discharge transistor Tr1 for the corresponding pixel generating unit 27. A signal line extends from each input electrode T_TG provided for each pixel generating unit 27 to the inside of the pixel set 25 and is connected with a gate electrode of the charge transfer transistor Tr2 for the corresponding pixel generating unit 27. A signal line extends from each input electrode T_RG to the inside of the pixel set 25 and is connected with a gate electrode of the output transistor Tr4 for the corresponding pixel generating unit 27. A signal line extends from each output electrode T_SG provided for each pixel generating unit 27 to the inside of the pixel set 25 and is connected with the source electrode of the output transistor Tr4.

The pixel generating units 27 in each pixel set 25 are represented as follows. The pixel set at the first row and the first column is represented as a first pixel generating unit. The pixel set at the first row and the second column is represented as a second pixel generating unit. The pixel set at the second row and the second column is represented as a third pixel generating unit. The pixel set at the second row and the first column is represented as a fourth pixel generating unit. Each component of the i-th (i=1, 2, 3, or 4) pixel generating unit 27 is suffixed by [i] to the corresponding reference symbol.

The suffix [i] is also attached to the following reference symbols: the input electrode T_DG connected to the discharge transistor Tr1 of the i-th (i=1, 2, 3, or 4) pixel generating unit 27; the input electrode T_TG connected to the charge transfer transistor Tr2 of the i-th (i=1, 2, 3, or 4) pixel generating unit 27; the input electrode T_RG connected to the output transistor Tr4 of the i-th (i=1, 2, 3, or 4) pixel generating unit 27; the output electrode T_SG connected to the output transistor Tr4 of the i-th (i=1, 2, 3, or 4) pixel generating unit 27; and the instruction signals DG, TG, and RG for the i-th (i=1, 2, 3, or 4) pixel generating unit 27.

Figure 5:
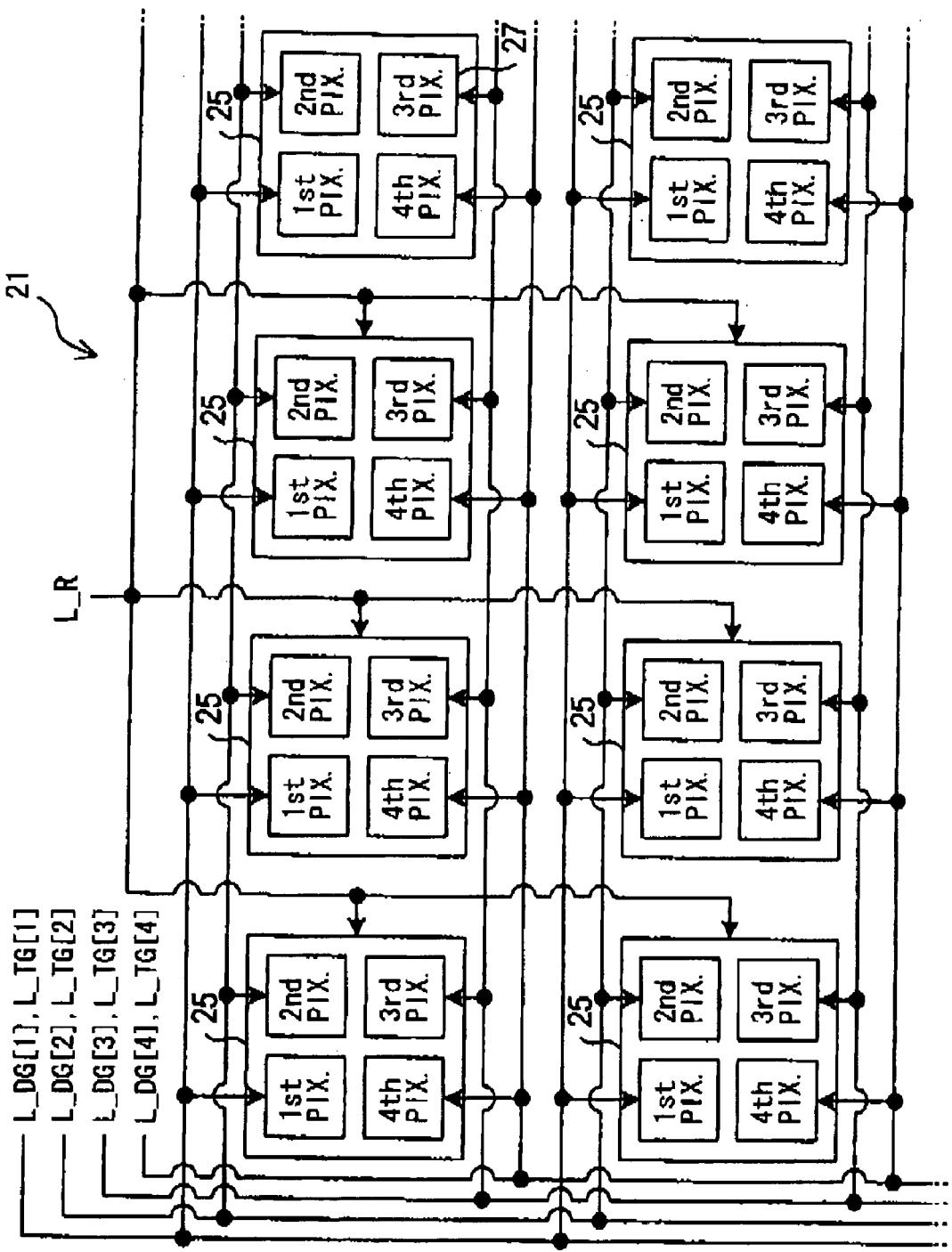
FIG. 5 is an explanatory diagram showing a mode of wiring signal lines for the photoelectric sensor according to the first embodiment.

As mentioned above, each pixel set 25 included in the pixel array 23 contains the electrodes T_R, T_DG[1] through T_DG[4], T_TG[1] through T_TG[4], T_RG[1] through T_RG[4], and T_SG[1] through T_SG[4]. As shown in FIG. 5, a common signal line is connected to input/output electrodes of each pixel set 25 included in the pixel array 23. FIG. 5 is an explanatory diagram showing a mode of wiring signal lines in the pixel array 23.

The pixel array 23 according to the embodiment is provided with a signal line L_R for supplying the reset instruction signal RST to each pixel generating unit 27. The signal line L_R is common to all the pixel sets 25 whose electrodes T_R connect with branch lines. The signal line L_R is connected to an input terminal Ta_R of the pixel array 23. The signal line L_R is supplied with the reset instruction signal RST from the signal generating section 40 through the input terminal Ta_R.

The pixel array 23 according to the embodiment is provided with the following signal lines for supplying the discharge instruction signal DG to the pixel generating units 27: a signal line L_DG[1] that is common to the first pixel generating units 27 and has a branch line connected to the electrode T_DG[1] of each pixel set 25; a signal line L_DG[2] that is common to the second pixel generating units 27 and has a branch line connected to the electrode T_DG[2] of each pixel set 25; a signal line L_DG[3] that is common to the third pixel generating units 27 and has a branch line connected to the electrode T_DG[3] of each pixel set 25; and a signal line L_DG[4] that is common to the fourth pixel generating units 27 and has a branch line connected to the electrode T_DG[4] of each pixel set 25. A signal line L_DG[i] is connected to an input terminal Ta_DG[i] of the pixel array 23. The signal line L_DG[i] is supplied with a discharge instruction signal DG[i] common to the i-th pixel generating units 27 from the signal generating section 40 through the input terminal Ta_DG[i].

The pixel array 23 is provided with the following signal lines for supplying the charge transfer instruction signal TG to the pixel generating units 27: a signal line L_TG[1] that is common to the first pixel generating units 27 and has a branch line connected to the electrode T_TG[1] of each pixel set 25; a signal line L_TG[2] that is common to the second pixel generating units 27 and has a branch line connected to the electrode T_TG[2] of each pixel set 25; a signal line L_TG[3] that is common to the third pixel generating units 27 and has a branch line connected to the electrode T_TG[3] of each pixel set 25; and a signal line L_TG[4] that is common to the fourth pixel generating units 27 and has a branch line connected to the electrode T_TG[4] of each pixel set 25. A signal line L_TG[i] is connected to an input terminal Ta_TG[i] of the pixel array 23. The signal line L_TG[i] is supplied with a charge transfer instruction signal TG[i] common to the i-th pixel generating units 27 from the signal generating section 40 through the input terminal Ta_TG[i].

In FIG. 5, the signal lines L_DG[i] and L_TG[i] are represented as a common line. Actually, these signal lines are independent of each other. Though not shown in FIG. 5, a signal line is connected to the electrodes T_RG[1] through T_RG[4]. The signal line is independently provided for each of the pixel generating units 27 included in the pixel array 23. Each signal line is connected to one of the input terminals Ta_RG for each of the pixel generating units 27 of the pixel array 23. Though not shown in FIG. 5, a signal line connects the electrode T_SG[i] with the writing section 29. The signal line is independently provided for each of the pixel generating units 27 included in the pixel array 23.

Figure 6:
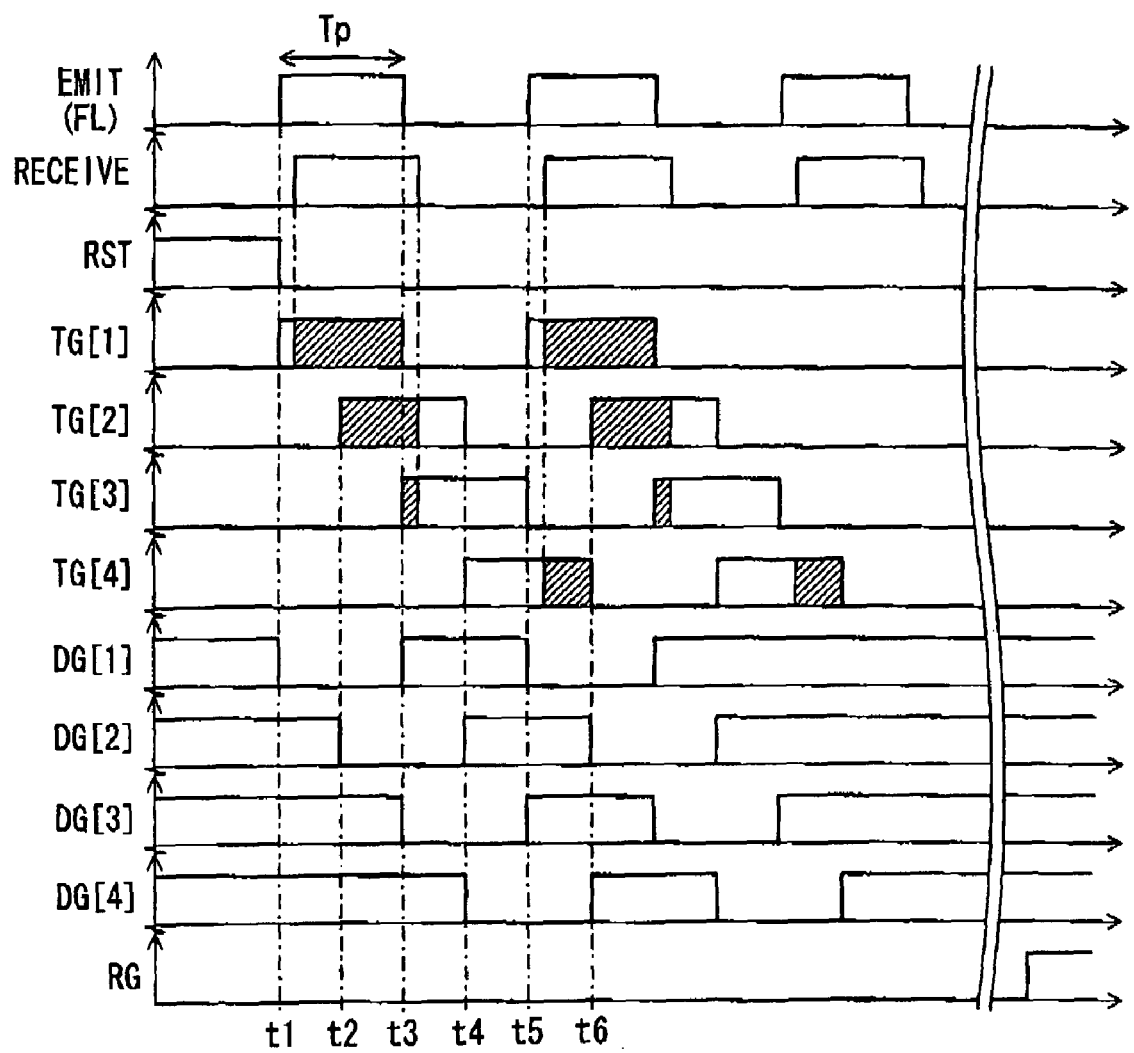
FIG. 6 is a time chart showing a pattern of signals output from a distance image generation signal output section according to the first embodiment.
Figure 7:
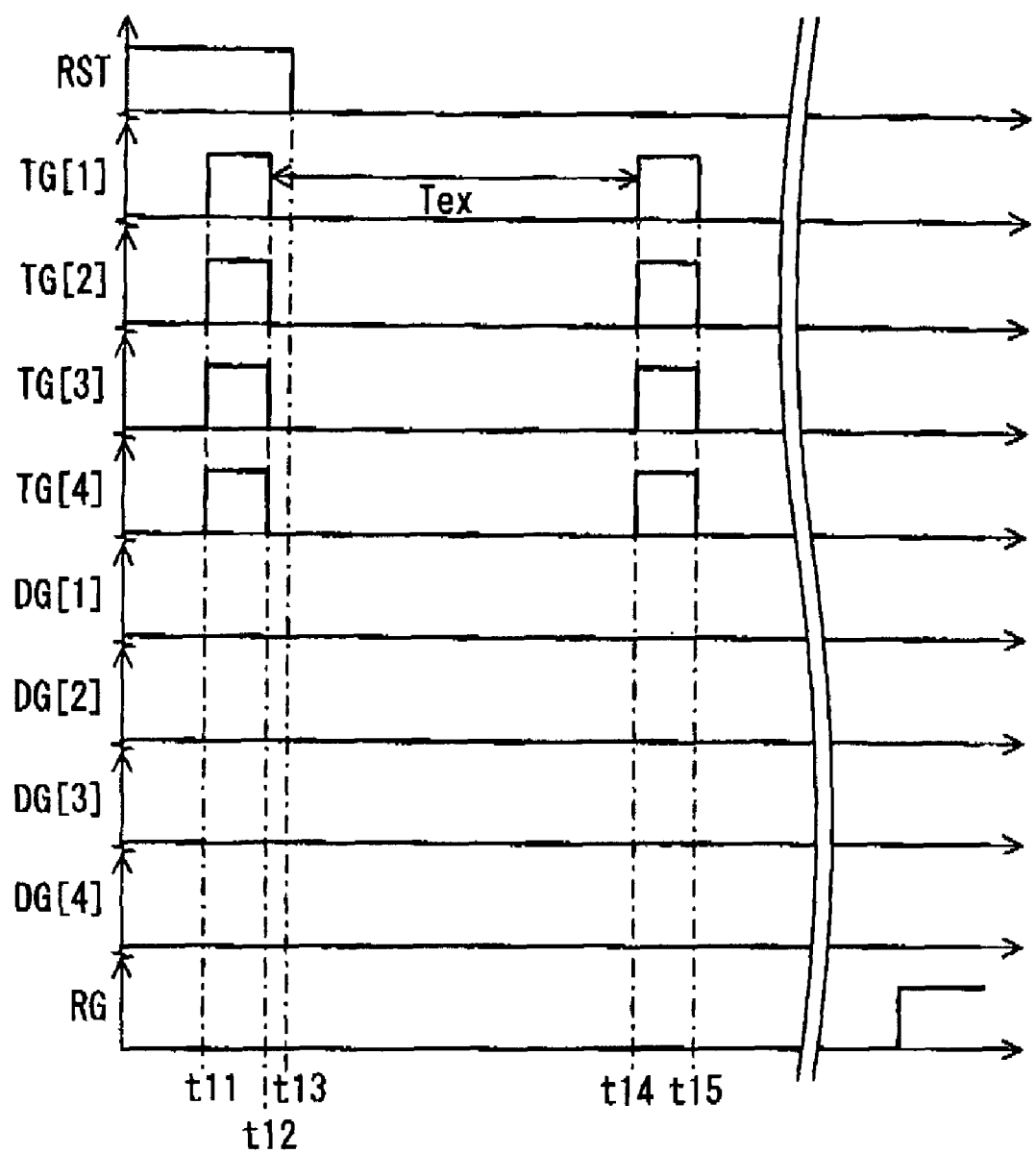
FIG. 7 is a time chart showing a pattern of signals output from a normal image generation signal output section according to the first embodiment.

The following describes a pattern of the instruction signals RST, TG[1] through TG[4], DG[1] through DG[4], and RG supplied to the pixel array 23 with reference to FIGS. 6 and 7. FIG. 6 is a time chart showing the pattern of the light emitting signal FL, the instruction signals RST, TG[1] through TG[4], DG[1] through G[4], and RG output from the distance image generation signal output section 41.

According to the embodiment, the control section 60 is supplied with a mode selection instruction for selecting a distance image mode from the outside via the interface section 70. The signal generating section 40 receives the mode selection instruction from the control section 60 and starts the distance image generation signal output section 41. When started, the distance image generation signal output section 41 repeatedly supplies the pattern of instruction signals in FIG. 6 to the drive circuit of the light emitting section 10 and the photoelectric sensor 21 of the light receiving section 20.

With reference to FIG. 6, as the start, the distance image generation signal output section 41 is initiated and starts a signal output operation. The distance image generation signal output section 41 first activates the reset instruction signal RST and the discharge instruction signals DG[1] through DG[4]. The distance image generation signal output section 41 inactivates the other instruction signals TG[1] through TG[4], and RG. The distance image generation signal output section 41 supplies the activated or inactivated instruction signals RST, TG[1] through TG[4], DG[1] through DG[4], and RG to the photoelectric sensor 21.

While the photoelectric sensor 21 is supplied with the active reset instruction signal RST, the reset transistor Tr5 turns on in each pixel generating unit 27 included in the photoelectric sensor 21. The floating diffusion FD discharges and is finally initialized (i.e., reset to an initial state).

While the photoelectric sensor 21 is supplied with the active discharge instruction signal DG[i], the discharge transistor Tr1 turns on in the i-th pixel generating unit 27. The photoelectric conversion element PD connected to the discharge transistor Tr1 discharges and is finally initialized.

At specified time t1 after activating the reset instruction signal RST, the distance image generation signal output section 41 starts supplying the light emitting signal FL to the light emitting section 10. The light emitting signal FL is a pulse signal (rectangular signal) having pulse width Tp in a cycle of 2×Tp. When the pulse signal is input to the drive circuit of the light emitting section 10, the light emitting section 10 accordingly emits pulsed light having pulse width Tp in a cycle of 2×Tp. The distance image generation signal output section 41 supplies multiple light emitting signals FL to the light emitting section 10 as one signal output operation for generating one piece of distance image data. Accordingly, one signal output operation emits the pulsed light more than once.

The distance image generation signal output section 41 inactivates the reset instruction signal RST at time t1 to start emitting the first pulsed light that is to be emitted more than once. At time t1, the distance image generation signal output section 41 inactivates the discharge instruction signal DG[1] and activates the charge transfer instruction signal TG[1].

At time t1, the instruction signals RST, DG[1], and TG[1] vary as mentioned above. At time t1, the floating diffusion FD[1] for the first pixel generating unit 27 in each pixel set 25 starts accumulating a charge generated by the photoelectric conversion element PD[1].

At time t2, the distance image generation signal output section 41 activates the charge transfer instruction signal TG[2] and inactivates the discharge instruction signal DG[2]. Time t2 occurs after the lapse of half the pulse width, i.e., Tp/2, later than the time to emit the pulsed light.

The instruction signals DG[2] and TG[2] vary as mentioned above. At time t2, the floating diffusion FD[2] for the second pixel generating unit 27 in each pixel set 25 starts accumulating a charge generated by the photoelectric conversion element PD[2].

At time t3, the distance image generation signal output section 41 inactivates the charge transfer instruction signal TG[1], activates the discharge instruction signal DG[1], activates the charge transfer instruction signal TG[3], and inactivates the discharge instruction signal DG[3] Time t3 occurs after the lapse of pulse width Tp later than time t1 to emit the pulsed light.

The instruction signals DG[1] and TG[1] vary as mentioned above. At time t3, the floating diffusion FD[1] for the first pixel generating unit 27 in each pixel set 25 stops accumulating the charge generated by the photoelectric conversion element PD[1]. The instruction signals DG[3] and TG[3] vary as mentioned above. At time t3, the floating diffusion FD[3] for the third pixel generating unit 27 in each pixel set 25 starts accumulating the charge generated by the photoelectric conversion element PD[3].

At time t4, the distance image generation signal output section 41 inactivates the charge transfer instruction signal TG[2], activates the discharge instruction signal DG[2], activates the charge transfer instruction signal TG[4], and inactivates the discharge instruction signal DG[4]. Time t4 occurs after the lapse of three halves of pulse width Tp, i.e., 3×Tp/2, later than time t1 to emit the pulsed light.

The instruction signals DG[2] and TG[2] vary as mentioned above. At time t4, the floating diffusion FD[2] stops accumulating the charge generated by the photoelectric conversion element PD[2]. The instruction signals DG[4] and TG[4] vary as mentioned above. At time t4, the floating diffusion FD[4] for the fourth pixel generating unit 27 in each pixel set 25 starts accumulating a charge generated by the photoelectric conversion element PD[4].

At time t5, the distance image generation signal output section 41 inactivates the charge transfer instruction signal TG[3] and activates the discharge instruction signal DG[3]. Time t5 occurs after the lapse of two pulse widths, i.e., 2×Tp, later than time t1 to emit the pulsed light. Synchronously with the emission of the pulsed light at the time point, the distance image generation signal output section 41 re-activates the charge transfer instruction signal TG[1] and inactivates the discharge instruction signal DG[1].

The instruction signals DG[3] and TG[3] vary as mentioned above. At time t5, the floating diffusion FD[3] stops accumulating the charge generated by the photoelectric conversion element PD[3]. The instruction signals DG[1] and TG[1] vary as mentioned above synchronously with the re-emission of the pulsed light. At time t5, the floating diffusion FD[1] for the first pixel generating unit 27 in each pixel set 25 restarts accumulating a charge generated by the photoelectric conversion element PD[1].

Time t6 occurs after the lapse of Tp/2 later than the time to re-emit the pulsed light. At time t6, the distance image generation signal output section 41 activates the charge transfer instruction signal TG[2] and inactivates the discharge instruction signal DG[2]. The floating diffusion FD[2] restarts accumulating a charge generated by the photoelectric conversion element PD[2].

At time t6, time Tp elapses after the charge transfer instruction signal TG[4] is activated. The distance image generation signal output section 41 inactivates the charge transfer instruction signal TG[4], activates the discharge instruction signal DG[4], and stops accumulating the charge generated by the photoelectric conversion element PD[4] in the floating diffusion FD[4].

Each time the pulsed light is emitted, the distance image generation signal output section 41 allows the floating diffusion FD[1] to accumulate a charge generated by the photoelectric conversion element PD[1] for the time equivalent to pulse width Tp from the time point of the emission. The distance image generation signal output section 41 allows the floating diffusion FD[2] to accumulate a charge generated by the photoelectric conversion element PD[2] for the time equivalent to pulse width Tp after the lapse of time Tp/2 from the time point of the emission. The distance image generation signal output section 41 allows the floating diffusion FD[3] to accumulate a charge generated by the photoelectric conversion element PD[3] for the time equivalent to pulse width Tp after the lapse of time Tp from the time point of the emission. The distance image generation signal output section 41 allows the floating diffusion FD[4] to accumulate a charge generated by the photoelectric conversion element PD[4] for the time equivalent to pulse width Tp after the lapse of time 3×Tp/2 from the time point of the emission.

The emitted light reflects on the subject 5 and returns as reflected light. As shown at the second row in FIG. 6, the reflected light deviates from the emitted light for phase φ. When the light emitting section 10 and the light receiving section 20 are controlled as mentioned above, the floating diffusions FD[1] through FD[4] accumulate charges corresponding to the amount of reflected light received during periods as shaded in FIG. 6.

When completing the emission of the pulsed light for the specified number of times, the distance image generation signal output section 41 supplies the activated instruction signal RG to the pixel generating units 27 in order. The distance image generation signal output section 41 allows the pixel generating unit 27 to output a value corresponding to the charge accumulated in the floating diffusion FD. The distance image generation signal output section 41 allows the writing section 29 to write the output value to the output data storage section 30.

There has been described one signal output operation performed by the distance image generation signal output section 41. The distance image generation signal output section 41 repeats the signal output operation until the signal generating section 40 is supplied with the mode selection instruction for selecting the normal image mode, stops the distance image generation signal output section 41, and starts the normal image generation signal output section 45.

With reference to FIG. 7, the following describes a pattern of the instruction signals RST, TG[1] through TG[4], DG[1] through DG[4], and RG output from the normal image generation signal output section 45. FIG. 7 is the time chart showing the pattern of the instruction signals RST, TG[1]

through TG[4], DG[1] through DG[4], and RG output from the normal image generation signal output section 45.

According to the embodiment as mentioned above, the control section 60 is supplied with the mode selection instruction for selecting the normal image mode from the outside via the interface section 70. The signal generating section 40 receives the mode selection instruction from the control section 60 and starts the normal image generation signal output section 45. When started, the normal image generation signal output section 45 repeatedly supplies the photoelectric sensor 21 with the pattern of instruction signals as shown in FIG. 7. The light emitting diode is not activated when plane image data is generated. The normal image generation signal output section 45 does not output the light emitting signal FL.

With reference to FIG. 7, as the start, the normal image generation signal output section 45 is initiated and starts a signal output operation. The normal image generation signal output section 45 first activates the reset instruction signal RST and inactivates the other instruction signals DG[1] through DG[4], TG[1] through TG[4], and RG. The normal image generation signal output section 45 supplies the activated or inactivated instruction signals RST, TG[1] through TG[4], DG[1] through DG[4], and RG to the photoelectric sensor 21.

That is, the normal image generation signal output section 45 supplies the photoelectric sensor 21 with the activated or inactivated instruction signals RST, TG[1] through TG[4], DG[1] through DG[4], and RG to turn on the reset transistor Tr5 in each pixel generating unit 27 included in the photoelectric sensor 21. The floating diffusion FD discharges and is initialized.

At specified time t11 after activating the reset instruction signal RST, the normal image generation signal output section 45 keeps the reset instruction signal RST active and activates the charge transfer instruction signals TG[1] through TG[4]. The normal image generation signal output section 45 turns on the charge transfer transistor Tr2 in each pixel generating unit 27 to discharge the photoelectric conversion element PD through the floating diffusion FD. The normal image generation signal output section 45 initializes the photoelectric conversion element PD and the floating diffusion FD.

At specified time t12 after activating the charge transfer instruction signals TG[1] through TG[4], the normal image generation signal output section 45 keeps the reset instruction signal RST active, inactivates the charge transfer instruction signals TG[1] through TG[4], and turns off the charge transfer transistor Tr2 in each pixel generating unit 27.

At specified time t13 after inactivating the charge transfer instruction signals TG[1] through TG[4], the normal image generation signal output section 45 inactivates the reset instruction signal PST.

Until specified time t14 is reached, the normal image generation signal output section 45 keeps instruction signals TG[1] through TG[4] and DG[1] through DG[4] inactive, allowing the photoelectric conversion elements PD[1] through PD[4] to generate a charge corresponding to background light radiated from the outside for specified time Tex (=t14–t12).

At time t14, the normal image generation signal output section 45 activates the charge transfer instruction signals TG[1] through TG[4] to turn on the charge transfer transistor Tr2 in each pixel generating unit 27. The normal image generation signal output section 45 transfers a charge generated by the photoelectric conversion element PD between times t12 and t14 to the floating diffusion FD and allows it to store the charge.

At specified time t15 after activating the charge transfer instruction signals TG[1] through TG[4], the normal image generation signal output section 45 deactivates these signals to stop transferring the charges generated by the photoelectric conversion elements PD[1] through PD[4] to the floating diffusion FD.

After each floating diffusion FD accumulates the charge equivalent to the background light, the normal image generation signal output section 45 supplies the activated instruction signal RG to the pixel generating units 27 in order. The normal image generation signal output section 45 allows the pixel generating unit 27 to output a value corresponding to the charge accumulated in the floating diffusion FD. The normal image generation signal output section 45 allows the writing section 29 to write the output value to the output data storage section 30.

There has been described one signal output operation performed by the normal image generation signal output section 45. The normal image generation signal output section 45 repeats the signal output operation until the signal generating section 40 is supplied from the control section 60 with the mode selection instruction for selecting the distance image mode, stops the normal image generation signal output section 45, and starts the distance image generation signal output section 41.

Figure 8:
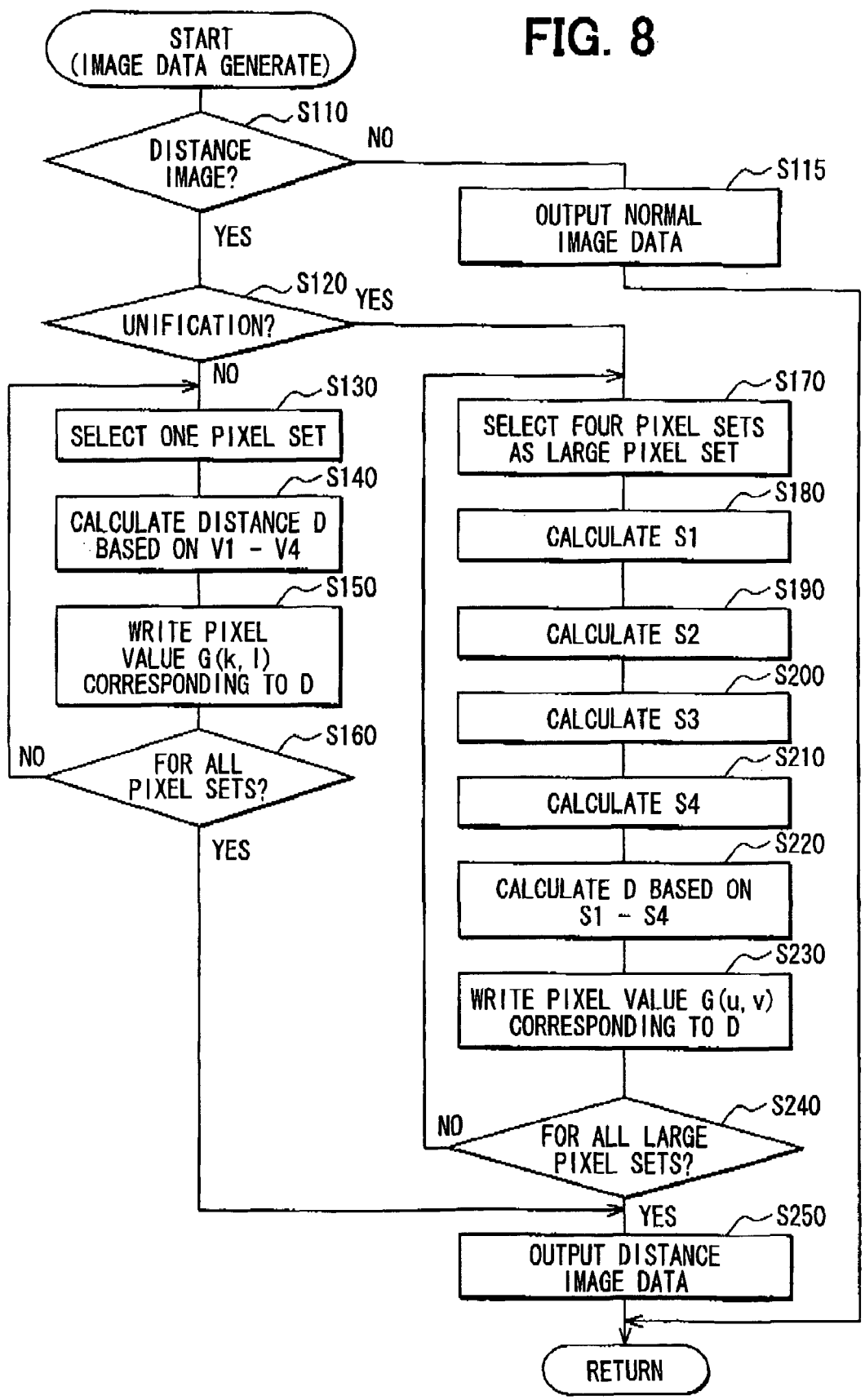
FIG. 8 is a flowchart showing an image data generation and output process performed by a control section according to the first embodiment.
Figure 9:
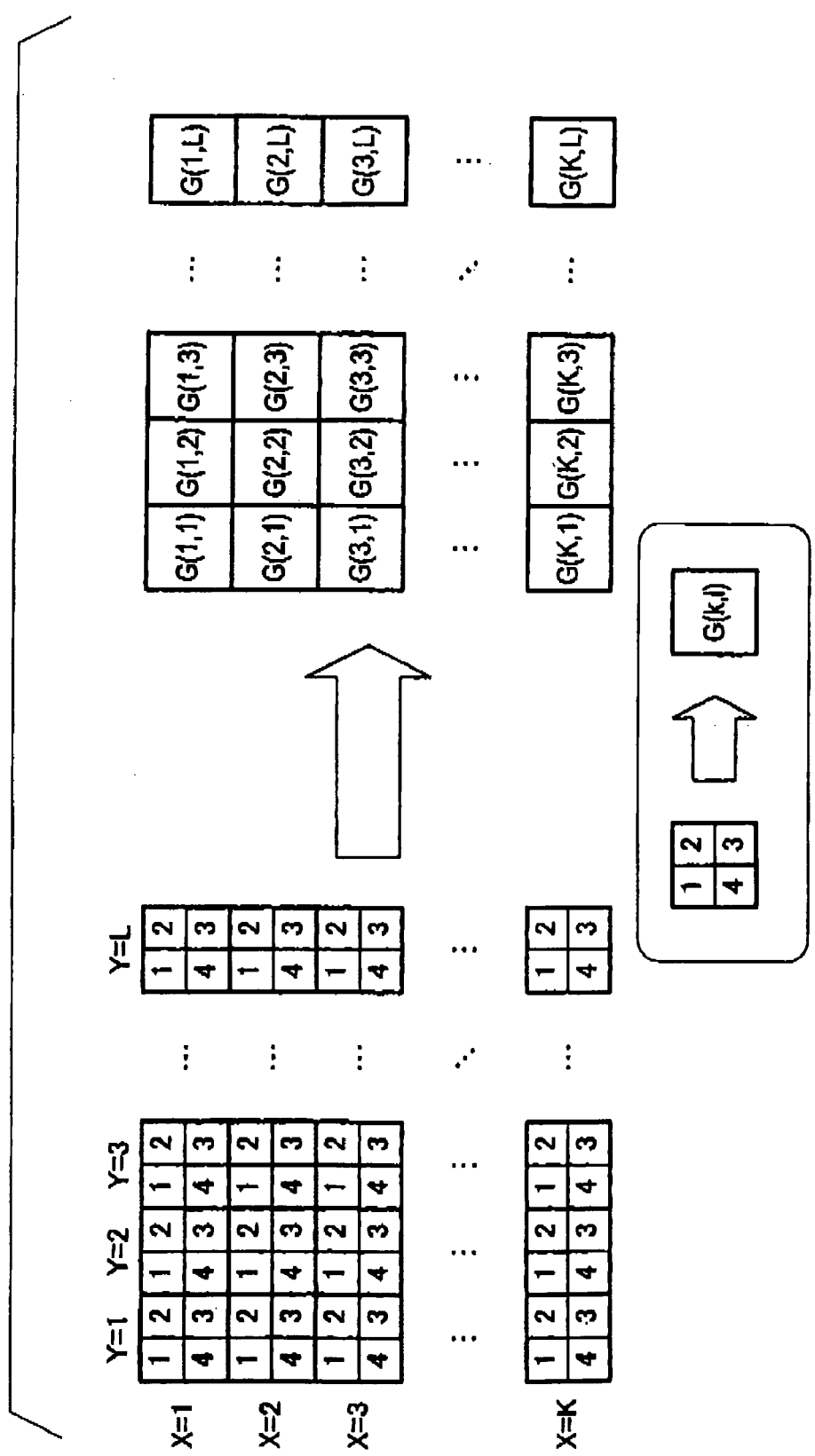
FIG. 9 is an explanatory diagram showing a method of generating distance image data when a unification function is disabled according to the first embodiment.
Figure 10:
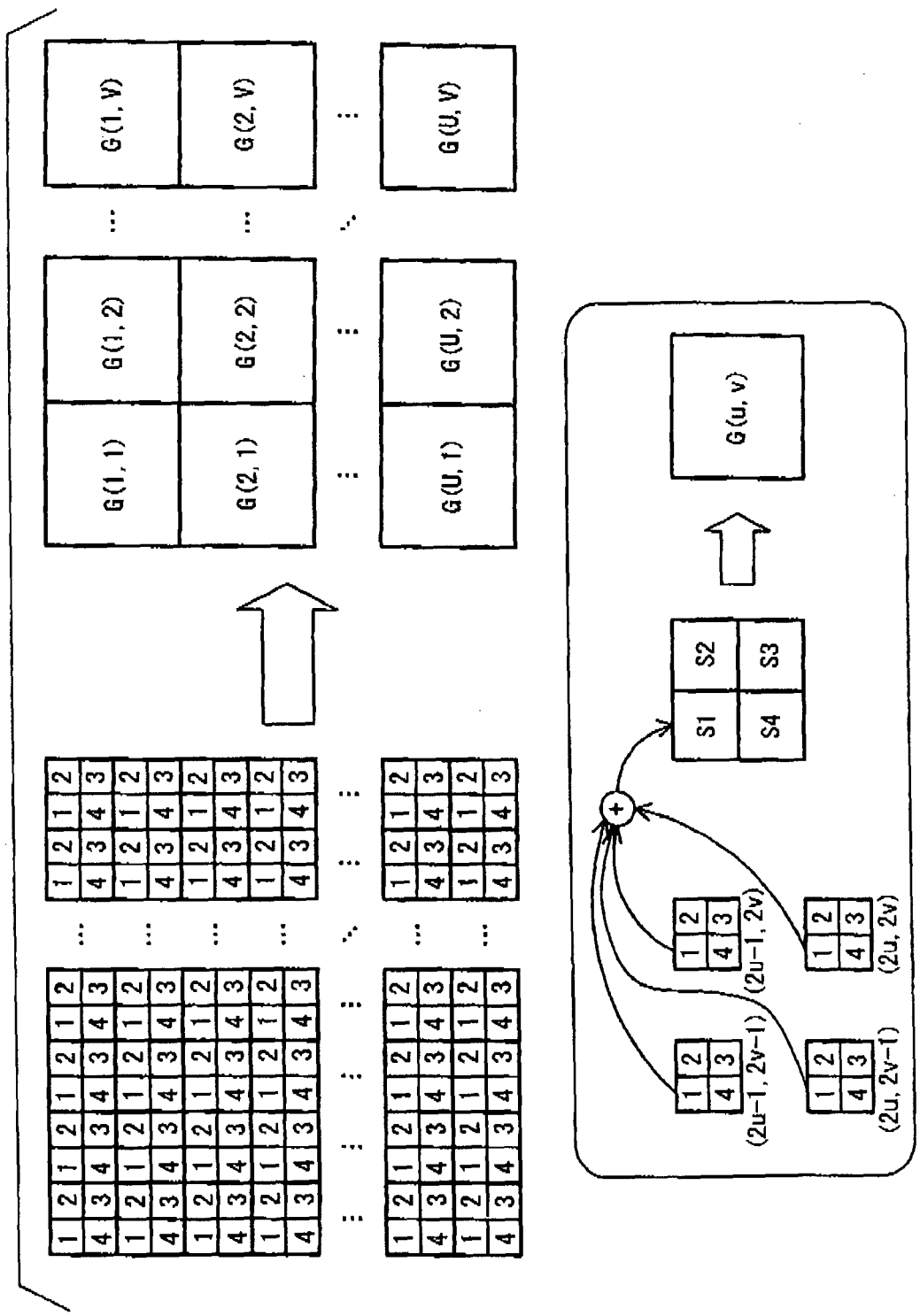
FIG. 10 is an explanatory diagram showing a method of generating distance image data when a unification function is enabled according to the first embodiment.

With reference to FIGS. 8 through 10, the following describes a process performed by the control section 60 based on output data the signal output operation of the signal generating section 40 stores in the output data storage section 30. FIG. 8 is a flowchart showing an image data generation and output process the control section 60 repeatedly performs during operations of the image data generating device 1. The control section 60 performs the image data generation and output process in accordance with a program to implement the above-mentioned image data generation and output function 60a.

When starting the image data generation and output process, the control section 60 determines whether or not the distance image mode is selected as an operation mode (Step S110). The above-mentioned mode selection function 60b selects the operation mode. During operations of the image data generating device 1, the control section 60 according to the embodiment selects the mode in accordance with the program to implement the mode selection function 60b. When supplied with an instruction to select the distance image mode from the outside via the interface section 70, the control section 60 inputs the instruction to the signal generating section 40. The control section 60 enables the distance image mode as an operation mode for the image data generation and output process. When supplied with an instruction to select the normal image mode from the outside via the interface section 70, the control section 60 inputs the instruction to the signal generating section 40. The control section 60 enables the normal image mode as an operation mode for the image data generation and output process. The embodiment initially assumes the normal image mode to be the operation mode.

The control section 60 proceeds to Step S120 when determining at Step S110 that the distance image mode is selected as the operation mode (Yes at Step S110). The control section 60 proceeds to Step S115 when determining at Step S110 that the normal image mode is selected as the operation mode (No at Step S110).

At Step S115, the control section 60 reads an output value for each pixel generating unit 27 as output data from the output data storage section 30. The control section 60 writes to a plane image data generation area in the RAM, a pixel value equivalent to the output value as a pixel value for a coordinate corresponding to the pixel generating unit 27 and completes the plane image data. The control section 60 outputs the completed plane image data via the interface section 70 and provides the data to the data processing device 80.

At Step S115, the control section 60 converts the output value for each pixel generating unit 27 into a shading value representing pixel shading. A shading value corresponds to an output value for the pixel generating unit 27 at the m-th row and the n-th column in the pixel set 25 at the k-th row and the l-th column. The control section 60 assumes the shading value to be a pixel value at coordinate $(2\times(k-1)+m, 2\times(l-1)+n)$. The control section 60 generates plane image data of $(2\times K)$ rows and $(2\times L)$ columns and outputs the data to the data processing device 80, where k denotes 1, 2, . . . , or K; l denotes 1, 2, . . . , or L; m denotes 1 or 2; and n denotes 1 or 2. The control section 60 once terminates the image data generation and output process. The control section 60 reperforms the image data generation and output process from Step S110 in accordance with a cycle of the signal output operation in the signal generating section 40 to repeatedly generate and output image data.

At Step S120, the control section 60 determines whether or not the unification function is enabled as an optional function of the image data generation and output process. The control section 60 proceeds to Step S170 when determining that the unification function is enabled (Yes at Step S120). The control section 60 proceeds to Step S130 when determining that the unification function is disabled (No at Step S120). According to the embodiment, the unification function is enabled or disabled from a device used to enter the mode selection instruction.

At Step S130, the control section 60 selects one of the pixel sets 25 included in the pixel array 23 so as to process it. The selected pixel set 25 to be processed includes the first, second, third, and fourth pixel generating units 27. The control section 60 reads output value V1 for the first pixel generating unit 27, output value V2 for the second one, output value V3 for the third one, and output value V4 for the fourth one from the output data storage section 30. Based on the output values V1, V2, V3, and V4, the control section 60 calculates phase difference φ between the reflected light and the emitted light entering the pixel set 25. Specifically, phase difference φ is calculated according to the following equation.

$$\phi = \arctan\{(V2-V4)/(V1-V3)\} \quad (6)$$

When phase difference φ is calculated, the control section 60 calculates distance D to the subject 5 based on phase difference φ using the following equation (Step S140).

$$D = c \times Tp \times \phi/(2\pi) \quad (7)$$

According to the embodiment, the signals are supplied in accordance with the pattern as shown in FIG. 6. The light emitting section 10 generates the pulsed light; thereby, each pixel generating unit 27 receives the reflected light. In this case, the control section 60 yields the output values V1, V2, V3, and V4 for the first, second, third, and fourth pixel generating units 27 respectively having the following relation with phase difference φ between the emitted light and the reflected light.

$$V1 \propto A \cos \phi + B$$

$$V2 \propto A \sin \phi + B$$

$$V3 \propto -A \cos \phi + B$$

$$V4 \propto -A \sin \phi + B \quad (8)$$

Constant A depends on an amplitude of the pulsed light that is reflected and returned. Constant B is a background light component. The embodiment can use the equation (6) to derive phase difference φ.

After calculating the phase difference φ and the distance D at Step S140, the control section 60 proceeds to Step S150 and converts the calculated distance D into a value representing the pixel shading. The control section 60 assumes the shading value to be a pixel value at the coordinate corresponding to the pixel set 25 to be processed for calculating the distance D and writes the value to a distance image data generation area in the RAM.

When the pixel set 25 at the k-th row and the l-th column is to be processed for calculating the distance D, the control section 60 assumes the converted shading value to be the pixel value at the coordinate (k, l) and writes the value to the RAM. In the following description, the pixel set 25 at the k-th row and the l-th column is assumed to be located at the coordinate $(X, Y) = (k, l)$. The pixel set 25 at the k-th row and the l-th column is represented as the pixel set 25 at the coordinate (k, l).

When the process at Step S150 is complete, the control section 60 determines whether or not pixel values are written for all the pixel sets 25 included in the pixel array 23 (Step S160). The control section 60 proceeds to step S130 when determining that pixel values are not written for all the pixel sets 25 (No at Step S160). The control section 60 selects one of the pixel sets 25 corresponding to unwritten pixel values so as to process it. The control section 60 performs the process at Steps S140 and S150 on the selected pixel set 25. Again, at Step S160, the control section 60 determines whether or not pixel values are written for all the pixel sets 25.

As shown in FIG. 9, the control section 60 repeats the above-mentioned operation to calculate the distance D from the output value for the pixel set 25 at the coordinate (k, l) where k ranges from 1 to K and l ranges from 1 to L. The control section 60 writes the shading value corresponding to the distance D as a pixel value G(k, l) at the coordinate (k, l) to the RAM and completes the distance image data of K rows and L columns. FIG. 9 is an explanatory diagram showing a method of generating distance image data when the unification function is disabled.

The control section 60 proceeds to Step S250 when pixel values for all the pixel sets 25 have been written to complete the distance image data of K rows and L columns. The control section 60 outputs the distance image data via the interface section 70. The distance image data is supplied to the data processing device 80. The control section 60 once terminates the image data generation and output process. The control section 60 reperforms the image data generation and output process from Step S110 in accordance with a cycle of the signal output operation in the signal generating section 40 to repeatedly generate and output image data.

The pixel set 25 of K rows and L columns included in the pixel array 23 is divided into a set of pixel sets 25 of two rows and two columns, i.e., a set of four pixel sets 25. This set is assumed to be a large pixel set. At Step S170, the control section 60 selects one large pixel set to be processed. That is, a set of the pixel sets 25 at coordinates (2u−1, 2v−1), (2u−1, 2v), (2u, 2v), and (2u, 2v−1) is assumed to be a large pixel set, where u ranges from 1 through K/2 and v ranges from 1 through L/2. The control section 60 selects one large pixel set to be processed.

Upon completion of the process at Step S170, the control section 60 reads from the output data storage section 30, an output value V1 for the first pixel generating unit 27 in each pixel set 25 included in the selected large pixel set to be processed. As shown in FIG. 10, the control section 60 totals output values V1 for the first pixel generating units 27 in the pixel sets 25 included in the large pixel set to calculate an integrated value S1 (Step S180). FIG. 10 is an explanatory diagram showing a method of generating distance image data when the unification function is enabled.

Similarly, at Step S190, the control section 60 reads an output value V2 for the second pixel generating unit 27 in each pixel set 25 included in the large pixel set to be processed. The control section 60 totals the read output values V2 for the pixel generating units 27 to calculate an integrated value S2.

At Step S200, the control section 60 reads an output value V3 for the third pixel generating unit 27 in each pixel set 25 included in the large pixel set to be processed. The control section 60 totals the read output values V3 for the pixel generating units 27 to calculate an integrated value S3.

At Step S210, the control section 60 reads an output value V4 for the fourth pixel generating unit 27 in each pixel set 25 included in the large pixel set to be processed. The control section 60 totals the read output values V4 for the pixel generating units 27 to calculate an integrated value S4.

Based on the integrated value S1, S2, S3, and S4, the control section 60 calculates phase difference $\phi$ between the reflected light and the emitted light entering the large pixel set using the following equation.

$$\phi = \arctan\{(S2-S4)/(S1-S3)\} \qquad (9)$$

Based on the phase difference $\phi$, the control section 60 calculates the distance D to the subject 5 using equation (7) (Step S220).

When calculating the distance D at Step S220, the control section 60 proceeds to Step S230 and converts the calculated distance D into a value representing the pixel shading. The control section 60 assumes the converted shading value to be a pixel value at the coordinate corresponding to the large pixel set to be processed for calculating the distance D and writes the value to the distance image data generation area in the RAM.

A large pixel set is assumed to be processed for calculating the distance D contains the pixel sets 25 at coordinates (2u−1, 2v−1), (2u−1, 2v), (2u, 2v), and (2u, 2v−1). In this case, the control section 60 assumes the converted shading value to be the pixel value G(u, v) at the coordinate (u, v) and writes the value to the RAM.

Upon completion of the process at Step S230, the control section 60 determines whether or not pixel values are written for all the large pixel sets (Step S240). The control section 60 proceeds to Step S170 when determining that pixel values are not written to all the large pixel sets (No at Step S240). The control section 60 selects one of the large pixel sets corresponding to unwritten pixel values so as to process it. The control section 60 performs the process at Steps S180 through S230 on the selected large pixel set. Again, at Step S240, the control section 60 determines whether or not pixel values are written for all the large pixel sets.

As shown in FIG. 10, the control section 60 repeats the above-mentioned operation to calculate the distance D from the output value for the pixel sets 25 at coordinates (2u−1, 2v−1), (2u−1, 2v), (2u, 2v), and (2u, 2v−1) where u ranges from 1 to K/2 and v ranges from 1 to L/2. The control section 60 writes the shading value corresponding to the distance D as a pixel value at the coordinate (u, v) to the RAM and completes the distance image data of K/2 rows and L/2 columns.

The control section 60 proceeds to Step S250 when the pixel values are written to all the large pixel sets to complete the distance image data of K/2 rows and L/2 columns (Yes at Step S240). The control section 60 outputs the completed distance image data via the interface section 70 and provides the data to the data processing device 80. The control section 60 once terminates the image data generation and output process. The control section 60 reperforms the image data generation and output process from Step S110 in accordance with a cycle of the signal output operation in the signal generating section 40 to repeatedly generate and output image data.

When the normal image mode is selected as the operation mode, the control section 60 according to the embodiment repeatedly generates and outputs plane image data in accordance with the signal output operation of the signal generating section 40 based on the data that is output by the signal output operation and is stored in the output data storage section 30. When the distance image mode is selected as the operation mode and the unification function is disabled, the control section 60 repeatedly generates and outputs standard-resolution distance image data in accordance with the signal output operation of the signal generating section 40 based on the data that is output by the signal output operation of the signal generating section 40 and is stored in the output data storage section 30. When the distance image mode is selected as the operation mode and the unification function is enabled, the control section 60 repeatedly generates and outputs low resolution distance image data in accordance with the signal output operation of the signal generating section 40 based on the data that is output by the signal output operation of the signal generating section 40 and is stored in the output data storage section 30.

There have been described the operations of the image data generating device 1 according to the first embodiment. According to the embodiment, the image data generating device 1 generates the plane image data by finding a pixel value on a pixel basis from an output value for each pixel generating unit 27. The image data generating device 1 generates the distance image data by finding a distance from an output value for each of the pixel generating units 27 belonging to the set thereof and calculating a pixel value on a pixel basis. According to the embodiment, the multiple pixel generating units 27 are used to find a distance to the subject. The pixel generating unit 27 is constructed so as to provide only one floating diffusion for one photoelectric conversion element.

The technique according to the embodiment constructs the image data generating device 1 so as to generate distance image data and can simplify the circuit construction of the pixel generating unit 27. The photoelectric conversion elements PD can be closely arranged to construct the pixel array 23. Accordingly, the embodiment can generate higher resolution plane image data than a conventional device that provides one photoelectric conversion element PD with multiple floating diffusions FD.

When the common pixel array 23 is used for a conventional distance image data generating device that can also generate plane image data, such a device can only generate plane image data whose resolution is equivalent to that of the distance image data. In contrast, the embodiment can use the common pixel array 23 to generate higher resolution plane image data than that of distance image data.

The embodiment constructs the image data generating device 1 so that a set of the pixel generating units 27 used for the distance calculation is changed to change the distance image data resolution in accordance with an instruction from the outside. The embodiment can provide the external data processing device 80 with distance image data adjusted to an optimal resolution.

The embodiment uses basically the same technique to calculate the distance D when generating low resolution and standard-resolution distance image data. The embodiment can provide the external data processing device 80 with distance image data having similar properties without changing resolutions.

According to the embodiment, the photoelectric sensor 21 contains the signal lines L_DG[i] and L_TG[i] common to the i-th pixel generating unit 27 in each pixel set 25. Since the embodiment provides the signal line L_R common to the pixel generating units 27, the common instruction signals RST, DG[1] through DG[4], TG[1] through TG[4] can be used to simultaneously control the pixel sets 25. According to the embodiment, simple signal input can simultaneously operate the pixel sets 25 and acquire the output values at the same time from the pixel sets 25. It is possible to generate optimum distance image data without temporal variations between pixels.

The signal output operation of the distance image generation signal output section 41 included in the signal generating section 40 and the process at Steps S120 through S250 performed by the control section 60 may include or function as a distance image data generation means or unit. The signal output operation of the normal image generation signal output section 45 included in the signal generating section 40 and the process at Step S115 performed by the control section 60 may include or function as a plane image data generation means or unit. The mode selection function 60b of the control section 60 may include or function as an operation control means or unit.

Second Embodiment

Figure 11:
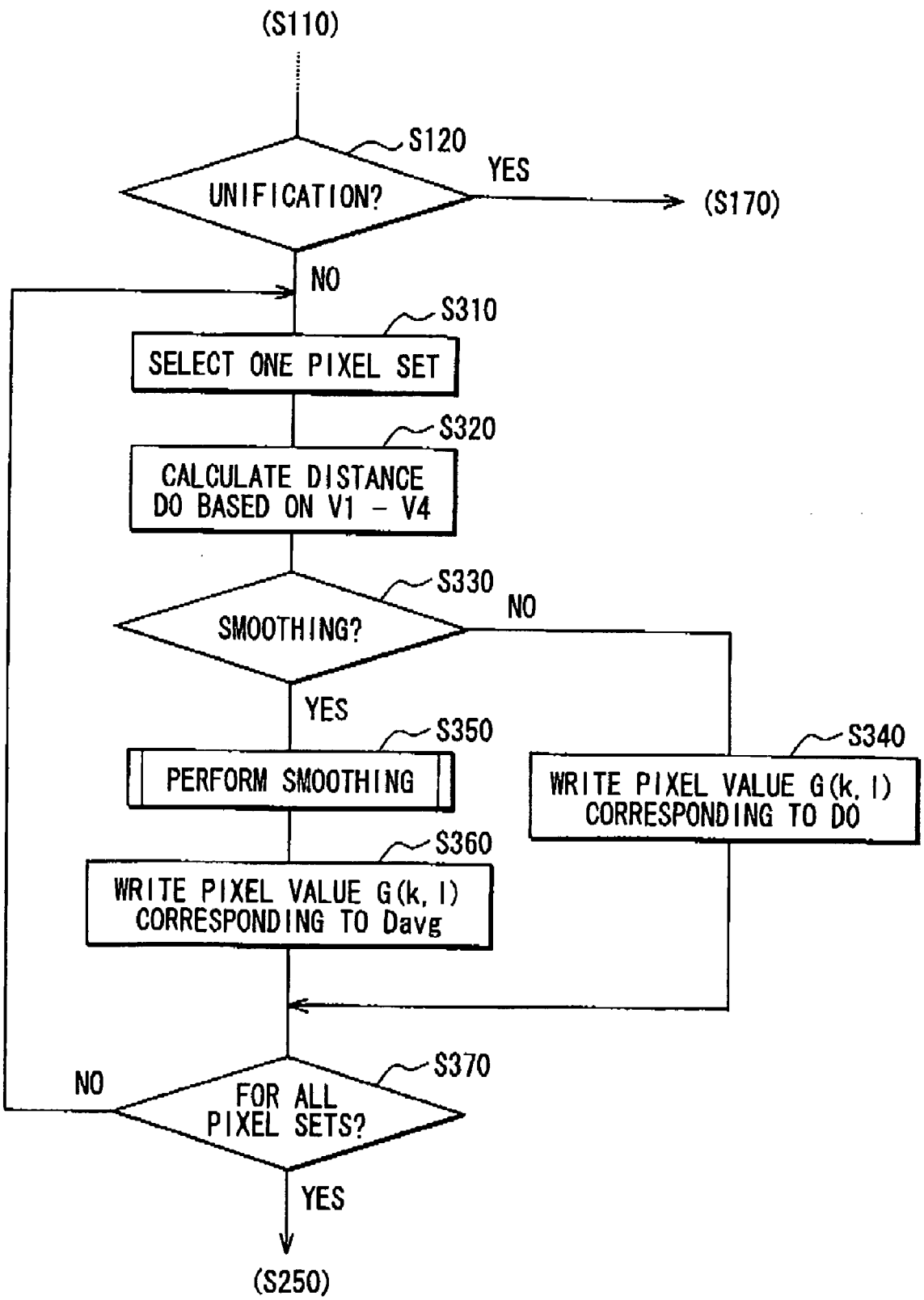
FIG. 11 is a flowchart showing part of the image data generation and output process performed in a second embodiment.

The construction of the image data generating device 1 according to a second embodiment will be described with reference to FIGS. 11 through 13. FIG. 11 is a flowchart showing part of the image data generation and output process performed by the control section 60 in the second embodiment.

The image data generating device 1 of the second embodiment differs from that of the first embodiment in part of the contents of the image data generation and output process performed by the control section 60. The remainder of the construction is basically the same as that of the image data generating device 1 according to the first embodiment. The description about the second embodiment just covers differences from the construction of the image data generating device 1 according to the first embodiment.

The control section 60 starts the image data generation and output process and proceeds to Step S120 to determine whether or not the unification function is enabled as an optional function of the image data generation and output process. The control section 60 proceeds to Step S170 when determining that the unification function is enabled (Yes at Step S120). The control section 60 proceeds to Step S310 when determining that the unification function is disabled (No at Step S120).

At Step S310, the control section 60 selects one of the pixel sets 25 included in the pixel array 23 so as to process it. The selected pixel set 25 to be processed includes the first, second, third, and fourth pixel generating units 27. The control section 60 reads output value V1 for the first pixel generating unit 27, output value V2 for the second one, output value V3 for the third one, and output value V4 for the fourth one from the output data storage section 30. Based on the output values V1, V2, V3, and V4, the control section 60 calculates phase difference φ between the reflected light and the emitted light entering the pixel set 25 according to equation (6). Based on the phase difference φ, the control section 60 calculates distance D to the subject 5 according to equation (7) (Step S320). At Step S320, the control section 60 defines the calculated distance D as D0 and temporarily stores it in the RAM.

The control section 60 proceeds to Step S330 and determines whether or not a first or second smoothing function is enabled as an optional function of the image data generation and output process. The control section 60 proceeds to Step S350 when determining that the first or second smoothing function is enabled (Yes at Step S330). The control section 60 proceeds to Step S340 when determining that neither the first nor second smoothing function is enabled (No at Step S330). According to the embodiment, the first and second smoothing functions are enabled or disabled from a device used to enter the mode selection instruction.

At Step S340, the control section 60 converts the distance D0 temporarily stored in the RAM into a shading value representing pixel shading. The control section 60 assumes the shading value to be a pixel value at the coordinate corresponding to the pixel set 25 to be processed for calculating the distance D0 and writes the value to the distance image data generation area in the RAM. When the pixel set 25 at the coordinate (k, l) is to be processed for calculating the distance D0, the control section 60 assumes the converted shading value to be the pixel value G(k, l) at the coordinate (k, l) and writes the value to the distance image data generation area in the RAM. The control section 60 proceeds to Step S370 upon completion of this process.

Figure 12:
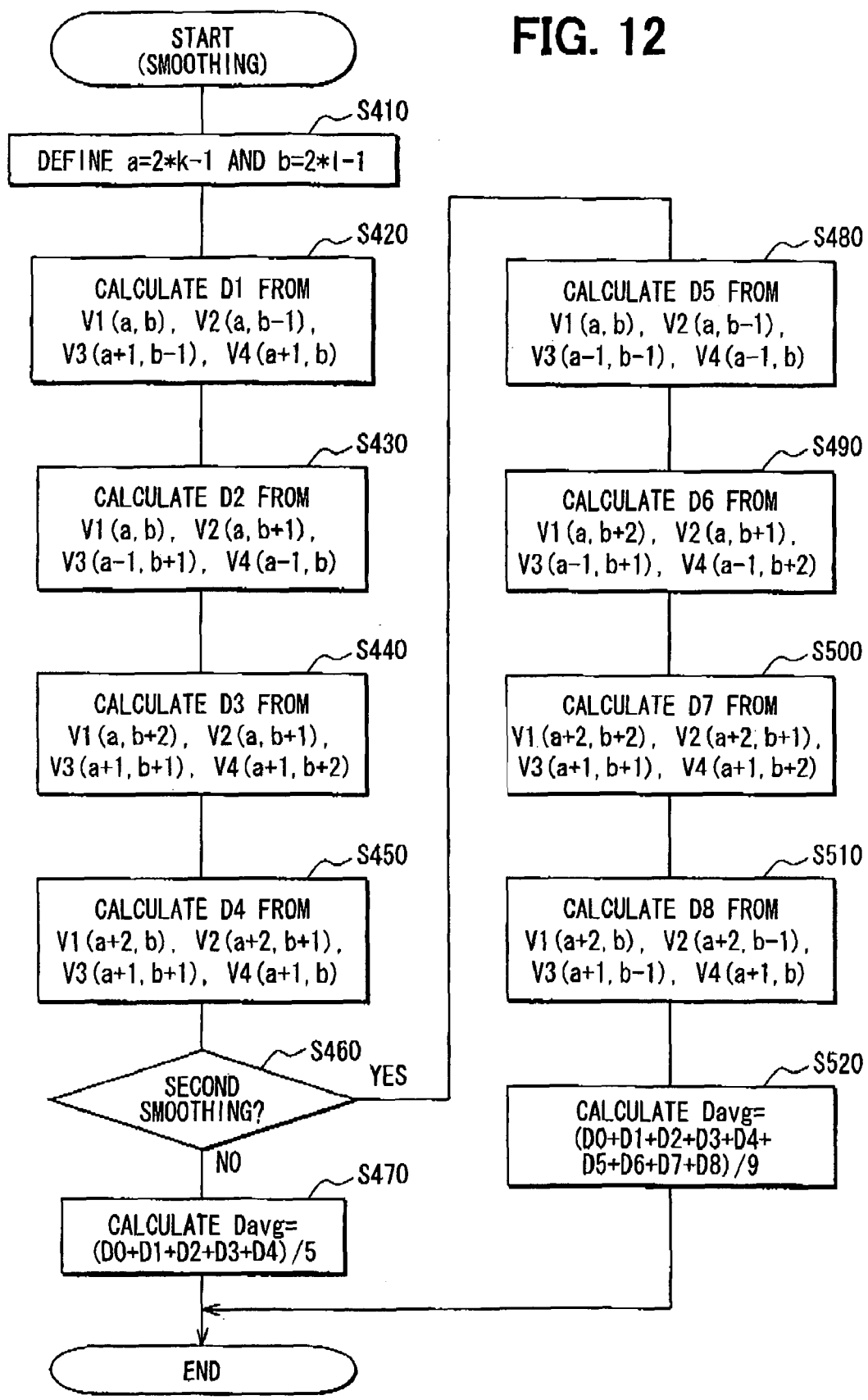
FIG. 12 is a flowchart showing a smoothing process performed by the control section according to the second embodiment.
Figure 13:
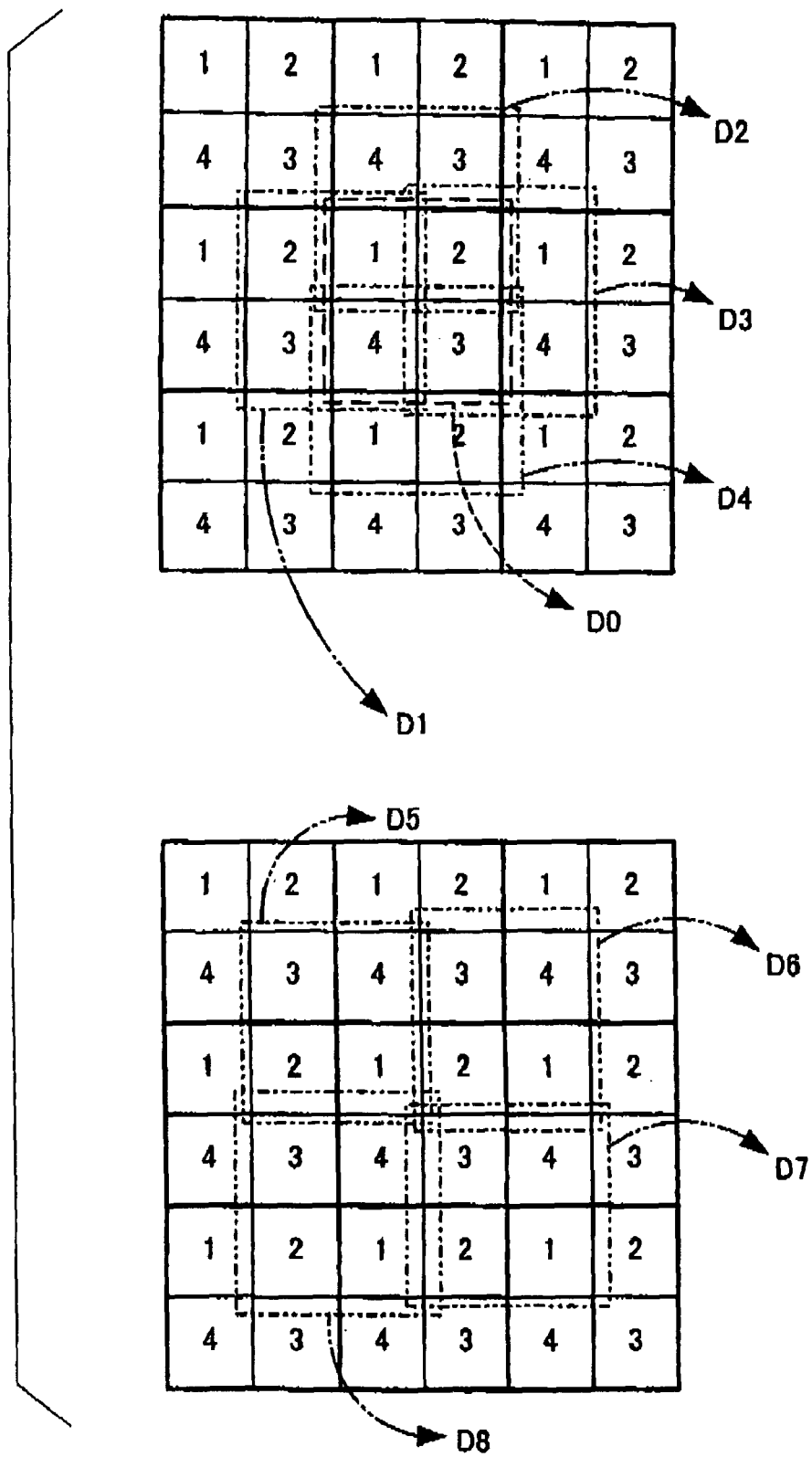
FIG. 13 is an explanatory diagram showing relationship between a distance D0 and distances D1 through D8 defined by the smoothing process according to the second embodiment.

When the first or second smoothing function is enabled, the control section 60 proceeds to Step S350 and performs a smoothing process as shown in FIG. 12. FIG. 12 is a flowchart showing the smoothing process performed by the control section 60.

After starting the smoothing process at Step S350, the control section 60 proceeds to Step S410 and defines a=2×k−1 and b=2×l−1. The elements k and l correspond to coordinate (k, l) of the pixel set 25 selected at Step S310 for processing. In the description below, the pixel generating unit 27 at the m-th row and the n-th column in the pixel set 25 at the k-th row and the l-th column is assumed to be located at coordinate (x, y) equal to (2×(k−1)+m, 2×(l−1)+n). The pixel generating unit 27 at the m-th row and the n-th column in the pixel set 25 at the k-th row and the l-th column is represented as the pixel generating unit 27 at coordinate (2×(k−1)+m, 2×(l−1)+n).

After completing the process at Step S410, the control section 60 proceeds to Step S420. Output values V1, V2, V3, and V4 correspond to the pixel generating units 27 at coordinates (a, b), (a, b−1), (a+1, b−1), and (a+1, b), respectively. The control section 60 assigns these values to equations (6) and (7) to calculate the distance D. The control section 60 defines the calculated distance D as the distance D1 and temporarily stores it in the RAM. The distance D1 stored in the RAM relates to the distance D0 as shown in FIG. 13. FIG. 13 is an explanatory diagram showing relationship between the distance D0 and the distances D1 through D8 defined by the smoothing process. Each block in FIG. 13 corresponds to the pixel generating unit 27. The block is assigned number i (i=1, 2, 3, or 4) to indicate the i-th pixel generating unit 27.

After completing the process at Step S420, the control section 60 proceeds to Step S430. Output values V1, V2, V3, and V4 correspond to the pixel generating units 27 at coordinates (a, b), (a, b+1), (a−1, b+1), and (a−1, b), respectively. The control section 60 assigns these values to equations (6) and (7) to calculate the distance D. The control section 60 defines the calculated distance D as the distance D2 and temporarily stores it in the RAM.

After completing the process at Step S430, the control section 60 proceeds to Step S440. Output values V1, V2, V3, and V4 correspond to the pixel generating units 27 at coordinates (a, b+2), (a, b+1), (a+1, b+1), and (a+1, b+2), respectively. The control section 60 assigns these values to equations (6) and (7) to calculate the distance D. The control section 60 defines the calculated distance D as the distance D3 and temporarily stores it in the RAM.

After completing the process at Step 8440, the control section 60 proceeds to Step S450. Output values V1, V2, V3, and V4 correspond to the pixel generating units 27 at coordinates (a+2, b), (a+2, b+1), (a+1, b+1), (a+1, b), respectively. The control section 60 assigns these values to equations (6) and (7) to calculate the distance D. The control section 60 defines the calculated distance D as the distance D4 and temporarily stores it in the RAM.

After completing the process at Step S450, the control section 60 proceeds to Step S460 and determines whether or not the second smoothing function is enabled. The control section 60 proceeds to Step S480 when determining that the second smoothing function is enabled (Yes at Step S460). The control section 60 proceeds to Step S470 when determining that the second smoothing function is disabled (No at Step S460).

At Step S470, the control section 60 calculates average value Davg of the distances D0, D1, D2, D3, and D4 temporarily stored in the RAM. The control section 60 then terminates the smoothing process and proceeds to Step S360 in FIG. 11.

At Step S480, output values V1, V2, V3, and V4 correspond to the pixel generating units 27 at coordinates (a, b), (a, b−1), (a−1, b−1), (a−1, b), respectively. The control section 60 assigns these values to equations (6) and (7) to calculate the distance D. The control section 60 defines the calculated distance D as the distance D5 and temporarily stores it in the RAM.

After completing the process at Step S480, the control section 60 proceeds to Step S490. Output values V1, V2, V3, and V4 correspond to the pixel generating units 27 at coordinates (a, b+2), (a, b+1), (a−1, b+1), (a−1, b+2), respectively. The control section 60 assigns these values to equations (6) and (7) to calculate the distance D. The control section 60 defines the calculated distance D as the distance D6 and temporarily stores it in the RAM.

After completing the process at Step S490, the control section 60 proceeds to Step S500. Output values V1, V2, V3, and V4 correspond to the pixel generating units 27 at coordinates (a+2, b+2), (a+2, b+1), (a+1, b+1), (a+1, b+2), respectively. The control section 60 assigns these values to equations (6) and (7) to calculate the distance D. The control section 60 defines the calculated distance D as the distance D7 and temporarily stores it in the RAM.

After completing the process at Step S500, the control section 60 proceeds to Step S510. Output values V1, V2, V3, and V4 correspond to the pixel generating units 27 at coordinates (a+2, b), (a+2, b−1), (a+1, b−1), (a+1, b), respectively. The control section 60 assigns these values to equations (6) and (7) to calculate the distance D. The control section 60 defines the calculated distance D as the distance D8 and temporarily stores it in the RAM.

After completing the process at Step S510, the control section 60 calculates average value Davg of the distances D0, D1, D2, D3, D4, D5, D6, D7, and D8 temporarily stored in the RAM (Step S520). The control section 60 then terminates the smoothing process and proceeds to Step S360 in FIG. 11.

At Step S360, the control section 60 converts the distance Davg calculated in the smoothing process into a shading value representing pixel shading. The control section 60 assumes the shading value to be a pixel value at the coordinate corresponding to the pixel set 25 to be processed for calculating the distance D0 and writes the value to the distance image data generation area in the RAM. When the pixel set 25 at the coordinate (k, l) is to be processed for calculating the distance D0, the control section 60 assumes the converted shading value to be the pixel value G(k, l) at the coordinate (k, l) and writes the value to the distance image data generation area in the RAM.

After completing this process, the control section 60 proceeds to Step S370 and determines whether or not pixel values have been written for all the pixel sets 25 included in the pixel array 23. The control section 60 proceeds to Step S310 when pixel values are not written for all the pixel sets 25 included in the pixel array 23 (No at Step S370). The control section 60 selects one of the pixel sets 25 corresponding to unwritten pixel values so as to process it. The control section 60 performs the process at Steps S320 through S360 on the selected pixel set 25. Again, at Step S370, the control section 60 determines whether or not pixel values are written for all the pixel sets 25.

When the first and second smoothing functions are disabled, the control section 60 repeats the above-mentioned operation to complete the distance image data of K rows and L columns similarly to the first embodiment. When the first or second smoothing function is enabled, the control section 60 calculates the distance Davg from an output value for the pixel set 25 at the coordinate (k, l), where k ranges from 1 to K and l ranges from 1 to L, and an output value for the pixel generating unit 27 around the pixel set 25. The control section 60 writes a shading value corresponding to the distance Davg as a pixel value at the coordinate (k, l) to the RAM and completes the distance image data of K rows and L columns.

The control section 60 proceeds to Step S250 when the pixel values are written for all the pixel sets 25 to complete the distance image data of K rows and L columns (Yes at Step S370). The control section 60 outputs the completed distance image data via the interface section 70 and provides the data to the data processing device 80. The control section 60 once terminates the image data generation and output process.

The image data generating device 1 according to the second embodiment has been described. When generating distance image data, the image data generating device 1 corrects the distance D0 resulting from each pixel set 25 against the distance values D1 through D8 resulting from the surrounding pixel generating units 27 and acquires a pixel value. Therefore, the embodiment can generate clear distance image data hardly affected by a noise.

Third Embodiment

Figure 14:
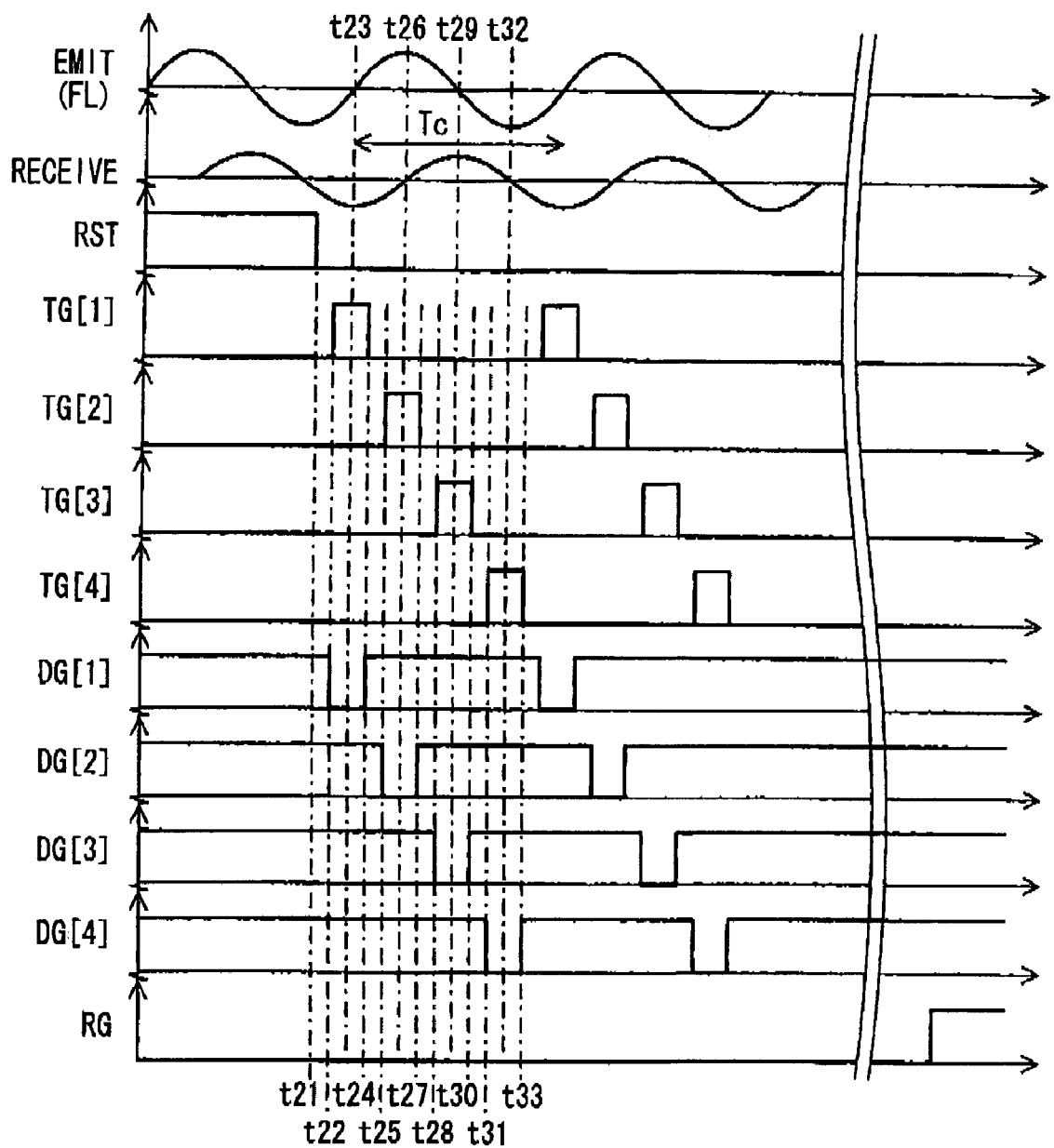
FIG. 14 is a time chart showing a pattern of signals output from the distance image generation signal output section according to a third embodiment.

The construction of the image data generating device 1 according to a third embodiment will be described with reference to FIG. 14. FIG. 14 is a time chart showing a pattern of signals output from the distance image generation signal output section 41 according to the third embodiment. The signals include the light emitting signal FL, the instruction signals RST, TG[1] through TG[4], DG[1] through DG[4], and RG.

The image data generating device 1 of the third embodiment has basically the same construction as that of the first embodiment except differences in the pattern of signals output from the distance image generation signal output section 41 and the method of calculating the distance D at Steps S140 and S220. The following describes the image data generating device 1 according to the third embodiment in terms of the differences from the first embodiment.

With reference to FIG. 14, as the start, the distance image generation signal output section 41 is initiated and starts a signal output operation. The distance image generation signal output section 41 activates the reset instruction signal RST and the discharge instruction signals DG[1] through DG[4] and inactivates the other instruction signals TG[1] through TG[4] and RG. The distance image generation signal output section 41 supplies the activated or inactivated instruction signals RST, TG[1] through TG[4], DG[1] through DG[4], and RG to the photoelectric sensor 21. In this manner, the distance image generation signal output section 41 turns on the discharge transistor Tr1 and the reset transistor Tr5 in each pixel generating unit 27 included in the photoelectric sensor 21.

At the same time, the distance image generation signal output section 41 starts supplying a sine wave at cycle Tc as the light emitting signal FL to the light emitting section 10. When such a sine wave is supplied to the drive circuit of the light emitting section 10 the light emitting diode accordingly emits sine-modulated light that is amplitude-modulated by the sine wave at cycle Tc. The distance image generation signal output section 41 supplies the light emitting section 10 with a sine wave at multiple cycles (three cycles according to the embodiment) as one signal output operation needed to generate one piece of distance image data.

After the light emitting section 10 and the light receiving section 20 start driving, the distance image generation signal output section 41 inactivates the reset instruction signal RST at specified time t21 later on.

At time t22, the distance image generation signal output section 41 inactivates the discharge instruction signal DG[1] and activates charge transfer instruction signal TG[1]. Time t22 occurs after time t21 and time interval Δt earlier than time t23 when the phase of the sine-modulated light is initialized to zero. At time t24, the distance image generation signal output section 41 activates the discharge instruction signal DG[1] and inactivates charge transfer instruction signal TG[1]. Time t24 occurs time interval Δt after time t23.

In this manner, the distance image generation signal output section 41 allows the first pixel generating unit 27 of each pixel set 25 included in the pixel array 23 to store a charge generated by the photoelectric conversion element PD[1] in the floating diffusion FD[1] within the small time interval of doubled Δt around the time when the sine-modulated light emitted from the light emitting section 10 is reset to phase 0.

At time t25, the distance image generation signal output section 41 inactivates the discharge instruction signal DG[2] and activates the charge transfer instruction signal TG[2]. Time t25 occurs after time t24 and time interval Δt earlier than time t26 that is later than time 23 by phase π/2. At time t27, the distance image generation signal output section 41 activates the discharge instruction signal DG[2] and inactivates the charge transfer instruction signal TG[2]. Tim t27 occurs time interval Δt after the time t26.

In this manner, the distance image generation signal output section 41 allows the second pixel generating unit 27 of each pixel set 25 included in the pixel array 23 to store a charge generated by the photoelectric conversion element PD[2] in the floating diffusion FD[2] within the small time interval of doubled Δt around the time when the sine-modulated light emitted from the light emitting section 10 is set to phase π/2.

At time t28, the distance image generation signal output section 41 inactivates the discharge instruction signal DG[3] and activates the charge transfer instruction signal TG[3]. Time t28 occurs after time t27 and time interval Δt earlier than time t29 that is later than time t23 by phase π. At time t30, the distance image generation signal output section 41 activates the discharge instruction signal DG[3] and inactivates the charge transfer instruction signal TG[3]. Time t30 occurs time interval Δt after the time t29.

In this manner, the distance image generation signal output section 41 allows the third pixel generating unit 27 of each pixel set 25 included in the pixel array 23 to store a charge generated by the photoelectric conversion element PD[3] in the floating diffusion FD[3] within the small time interval of doubled Δt around the time when the sine-modulated light emitted from the light emitting section 10 is set to phase π.

At time t31, the distance image generation signal output section 41 inactivates the discharge instruction signal DG[4] and activates the charge transfer instruction signal TG[4]. Time t31 occurs after time t30 and time interval Δt earlier than time t32 that is later than time t23 by phase 3π/2. At time t33, the distance image generation signal output section 41 activates the discharge instruction signal DG[4] and inactivates the charge transfer instruction signal TG[4]. Time t33 occurs time interval Δt after the time t32.

In this manner, the distance image generation signal output section 41 allows the fourth pixel generating unit 27 of each pixel set 25 included in the pixel array 23 to store a charge generated by the photoelectric conversion element PD[4] in the floating diffusion FD[4] within the small time interval of doubled Δt around the time when the sine-modulated light emitted from the light emitting section 10 is set to phase 3π/2.

The distance image generation signal output section 41 repeatedly outputs the pattern of signals in accordance with the cycle of the sine-modulated light and allows the floating diffusion FD to store a charge as follows. The floating diffusion FD[1] stores a charge generated from the photoelectric conversion element PD[1] within the small time interval of doubled Δt around the reference time when the sine modulated light is reset to phase 0. The floating diffusion FD[2] stores a charge generated from the photoelectric conversion element PD[2] within the small time interval of doubled Δt around the time later than the reference time by phase π/2. The floating diffusion FD[3] stores a charge generated from the photoelectric conversion element PD[3] within the small time interval of doubled Δt around the time later than the reference time by phase π. The floating diffusion FD[4] stores a charge generated from the photoelectric conversion element PD[4] within the small time interval of doubled Δt around the time later than the reference time by phase 3π/2.

When completing the emission of the one-time sine-modulated light, the distance image generation signal output section 41 supplies the activated instruction signal RG to the pixel generating units 27 in order. The distance image generation signal output section 41 allows the pixel generating unit 27 to output a value corresponding to the charge stored in the floating diffusion FD. The distance image generation signal output section 41 allows the writing section 29 to write the output value to the output data storage section 30.

There has been described one signal output operation performed by the distance image generation signal output section 41. When the signals as shown in FIG. 14 are supplied, the light emitting section 10 generates the sine-modulated light. Each pixel generating unit 27 receives the reflected light. In this case, the control section 60 yields the output values V1, V2, V3, and V4 for the first, second, third, and fourth pixel generating units 27 respectively having the following relation with phase difference φ between the emitted light and the reflected light.

$$V1 \propto -A \sin \phi + B$$

$$V2 \propto A \cos \phi + B$$

$$V3 \propto A \sin \phi + B$$

$$V4 \propto -A \cos \phi + B \tag{10}$$

Constant A depends on an amplitude of the sine-modulated light that is reflected and returned. Constant B is a background light component. The embodiment can use the following equations to derive phase difference $\phi$ and distance D.

$$\phi = \arctan\{(V3-V1)/(V2-V4)\} \tag{11}$$

$$D = c \times (Tc/2) \times \phi/(2\pi) \tag{12}$$

At Step S140 of the image data generation and output process, the control section 60 of the image data generating device 1 according to the embodiment calculates the distance D using equations (11) and (12) based on the output values V1, V2, V3, and V4 for the first, second, third, and fourth pixel generating units 27 respectively. The control section 60 generates distance image data based on the distance D.

At Step S220 of the image data generation and output process, the control section 60 calculates phase difference $\phi$ using the following equation based on the integrated values S1, S2, S3, and S4 calculated at Steps S180 through S210.

$$\phi = \arctan\{(S3-S1)/(S2-S4)\} \tag{13}$$

The control section 60 calculates the distance D using equation (12) based on the calculated phase difference $\phi$. The control section 60 generates distance image data based on the distance D.

There have been described the operations of the image data generating device 1 according to the third embodiment. When generating the distance image data, the image data generating device 1 according to the embodiment emits the sine modulated light for calculating the distance D to the subject 5. Unlike emission of the pulsed light, the embodiment can sufficiently avoid an error and accurately calculate the distance D. The embodiment can ensure the light emitting intensity more efficiently than the first embodiment for the pulse modulation and improve the distance resolution.

Fourth Embodiment

Figure 15:
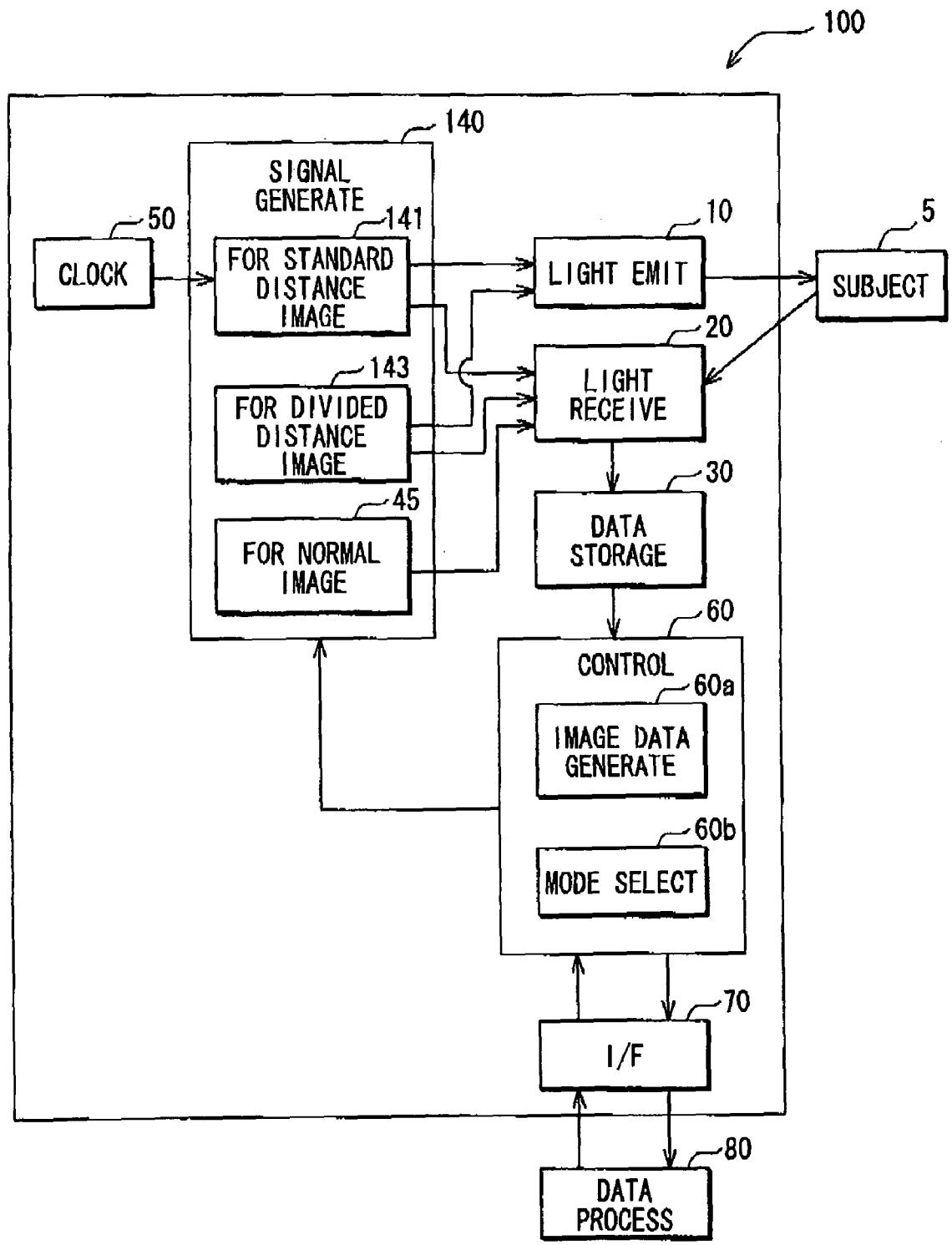
FIG. 15 is a block diagram showing a construction of an image data generating device according to a fourth embodiment.

The construction of the image data generating device 1 according to a fourth embodiment will be described with reference to FIGS. 15 through 19B. FIG. 15 is a block diagram showing a construction of the image data generating device 100 according to the fourth embodiment.

The image data generating device 100 of the fourth embodiment is basically the same as that of the first embodiment except that the signal generating section 140 includes a standard distance image generation signal output section 141 and a divided distance image generation signal output section 143 and the control section 60 differently performs the image data generation and output process. The description about the fourth embodiment just covers differences from the construction of the image data generating device 1 according to the first embodiment.

As shown in FIG. 15, the signal generating section 140 of the image data generating device 100 according to the embodiment includes the standard distance image generation signal output section 141, the divided distance image generation signal output section 143, and the normal image generation signal output section 45. According to this construction, the image data generating device 100 can accept instructions for selecting standard distance image mode and divided distance image mode from the outside via the interface section 70.

During operations of the image data generating device 100, the control section 60 according to the embodiment selects the mode in accordance with the program to implement the mode selection function 60b shown in FIG. 15. When supplied with an instruction to select the standard distance image mode from the outside via the interface section 70, the control section 60 inputs the instruction to the signal generating section 140. The control section 60 enables the standard distance image mode as an operation mode for the image data generation and output process.

When supplied with an instruction to select the divided distance image mode from the outside via the interface section 70, the control section 60 inputs the instruction to the signal generating section 140. The control section 60 enables the divided distance image mode as an operation mode for the image data generation and output process.

When supplied with an instruction to select the normal image mode from the outside via the interface section 70, the control section 60 inputs the instruction to the signal generating section 140. The control section 60 enables the normal image mode as an operation mode for the image data generation and output process.

When supplied with the instruction to select the standard distance image mode, the signal generating section 140 selectively starts the standard distance image generation signal output section 141. The signal generating section 140 stops the divided distance image generation signal output section 143 and the normal image generation signal output section 45. When supplied with the instruction to select the divided distance image mode, the signal generating section 140 selectively starts the divided distance image generation signal output section 143. The signal generating section 140 stops the standard distance image generation signal output section 141 and the normal image generation signal output section 45. When supplied with the instruction to select the normal image mode, the signal generating section 140 selectively starts the normal image generation signal output section 45. The signal generating section 140 stops the standard distance image generation signal output section 141 and the divided distance image generation signal output section 143.

Figure 16:
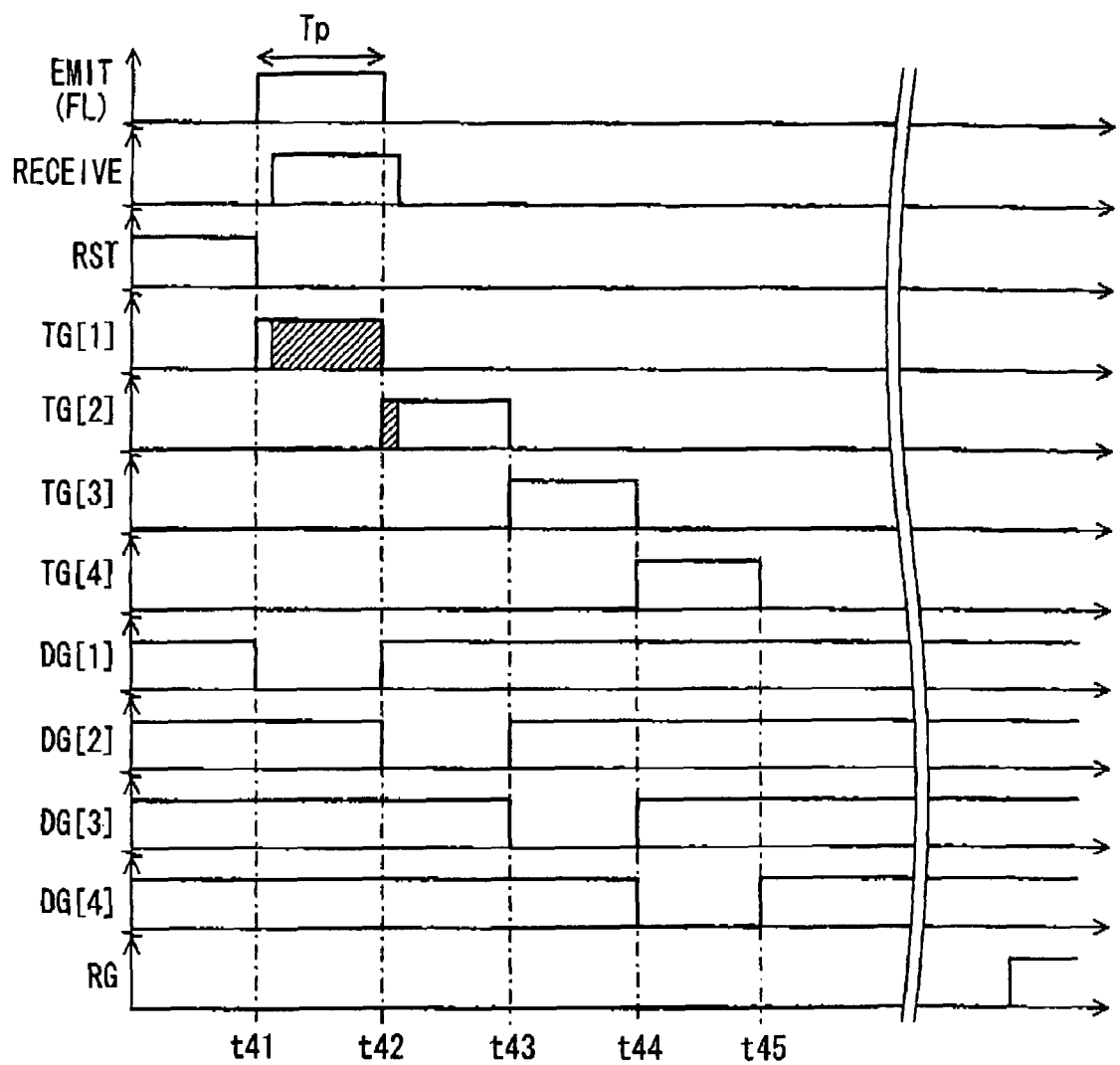
FIG. 16 is a time chart showing a pattern of signals output from a standard distance image generation signal output section according to the fourth embodiment.

The standard distance image generation signal output section 141 outputs a pattern of the light emitting signal FL, the instruction signals RST, TG[1] through TG[4], DG[1] through DG[4], and RG as shown in FIG. 16. The standard distance image generation signal output section 141 supplies the light emitting signal FL to the drive circuit of the light emitting section 10. The standard distance image generation signal output section 141 supplies the instruction signals RST, TG[1] through TG[4], DG[1] through DG[4], and RG to the photoelectric sensor 21. FIG. 16 is a time chart showing the pattern of the light emitting signal FL, the instruction signals RST, TG[1] through TG[4], DG[1] through DG[4], and RG output from the standard distance image generation signal output section 141.

With reference to FIG. 16, as the start, the standard distance image generation signal output section 141 is initiated and starts a signal output operation. The standard distance image generation signal output section 141 first activates the reset instruction signal RST and the discharge instruction signals DG[1] through DG[4]. The standard distance image generation signal output section 141 inactivates the other instruction signals TG[1] through TG[4], and RG. The standard distance image generation signal output section 141 supplies the activated or inactivated instruction signals RST, TG[1] through TG[4], DG[1] through DG[4], and RG to the photoelectric sensor 21. This operation turns on the discharge transistor Tr1 and the reset transistor Tr5 in each pixel generating unit 27 included in the photoelectric sensor 21. The photoelectric conversion element PD and the floating diffusion FD are initialized.

At specified time t41 after activating the reset instruction signal RST, the standard distance image generation signal output section 141 starts supplying the light emitting section 10 with the light emitting signal FL, i.e., a pulse signal having pulse width Tp in a cycle of (4×Tp+α), where α is a positive value including zero defined by a designer. When the pulse signal is input to the drive circuit of the light emitting section 10, the light emitting section 10 accordingly emits pulsed light having pulse width Tp in a cycle of (4×Tp+α). Though not shown in FIG. 16, the standard distance image generation signal output section 141 supplies multiple light emitting signals FL to the light emitting section 10 as a signal output operation for generating one piece of distance image data. Accordingly, one signal output operation emits the pulsed light more than once.

The standard distance image generation signal output section 141 inactivates the reset instruction signal RST at time t1 to start emitting the first pulsed light that is to be emitted more than once. At time t41, the standard distance image generation signal output section 141 inactivates the discharge instruction signal DG[1] and activates the charge transfer instruction signal TG[1]. At time t41, the floating diffusion FD[1] for the first pixel generating unit 27 in each pixel set 25 starts accumulating a charge generated by the photoelectric conversion element PD[1].

At time t42, the standard distance image generation signal output section 141 inactivates the charge transfer instruction signal TG[1], activates the discharge instruction signal DG[1], activates the charge transfer instruction signal TG[2], and inactivates the discharge instruction signal DG[2]. Time t42 occurs by a time interval equivalent to the pulse width Tp later than the time to emit the pulsed light.

At time t42, the floating diffusion FD[1] for the first pixel generating unit 27 in each pixel set 25 completes accumulating a charge generated by the photoelectric conversion element PD[1]. The floating diffusion FD[2] for the second pixel generating unit 27 in each pixel set 25 starts accumulating a charge generated by the photoelectric conversion element PD[2].

At time t43, the standard distance image generation signal output section 141 inactivates the charge transfer instruction signal TG[2], activates the discharge instruction signal DG[2], activates the charge transfer instruction signal TG[3], and inactivates the discharge instruction signal DG[3]. Time t43 occurs 2×Tp later than the time to emit the pulsed light.

At time t43, the floating diffusion FD[2] for the second pixel generating unit 27 in each pixel set 25 completes accumulating a charge generated by the photoelectric conversion element PD[2]. The floating diffusion FD[3] for the third pixel generating unit 27 in each pixel set 25 starts accumulating a charge generated by the photoelectric conversion element PD[3].

At time t44, the standard distance image generation signal output section 141 inactivates the charge transfer instruction signal TG[3], activates the discharge instruction signal DG[3], activates the charge transfer instruction signal TG[4], and inactivates the discharge instruction signal DG[4]. Time t44 occurs 3×Tp later than the time to emit the pulsed light.

At time t44, the floating diffusion FD[3] for the third pixel generating unit 27 in each pixel set 25 completes accumulating a charge generated by the photoelectric conversion element PD[3]. The floating diffusion FD[4] for the fourth pixel generating unit 27 in each pixel set 25 starts accumulating a charge generated by the photoelectric conversion element PD[4].

At time t45, the standard distance image generation signal output section 141 inactivates the charge transfer instruction signal TG[4], activates the discharge instruction signal DG[4]. Time t44 occurs 4×Tp later than the time to emit the pulsed light. At time t45, the floating diffusion FD[4] for the fourth pixel generating unit 27 in each pixel set 25 completes accumulating a charge generated by the photoelectric conversion element PD[4].

After a lapse of time interval a from time t45, the standard distance image generation signal output section 141 allows the light emitting section 10 to emit the next pulsed light in accordance with light emitting signal FL. Simultaneously with the emission of the pulsed light, the standard distance image generation signal output section 141 supplies the photoelectric sensor 21 with the instruction signals TG[1] through TG[4] and DG[1] through DG[4] in the same pattern as that for time t41 through time t45 as mentioned above.

Each time the pulsed light is emitted, the standard distance image generation signal output section 141 allows the floating diffusion FD[1] to accumulate a charge generated by the photoelectric conversion element PD[1] for the time equivalent to pulse width Tp from the time point of the emission. The standard distance image generation signal output section 141 allows the floating diffusion FD[2] to accumulate a charge generated by the photoelectric conversion element PD[2] for the time equivalent to pulse width Tp after the lapse of time Tp from the time point of the emission.

The emitted light reflects on the subject 5 and returns as reflected light. As shown at the second row in FIG. 16, the reflected light deviates from the emitted light for phase φ. When the light emitting section 10 and the light receiving section 20 are controlled as mentioned above, the floating diffusions FD[1] and FD[2] accumulate charges corresponding to the amount of reflected light received during periods as shaded in FIG. 16.

Each time the pulsed light is emitted, the standard distance image generation signal output section 141 allows the floating diffusion FD[3] to accumulate a charge generated by the photoelectric conversion element PD[3] for the time equivalent to pulse width Tp after the lapse of time 2×Tp from the time point of the emission. The standard distance image generation signal output section 141 allows the floating diffusion FD[4] to accumulate a charge generated by the photoelectric conversion element PD[4] for the time equivalent to pulse width Tp after the lapse of time 3×Tp from the time point of the emission. The standard distance image generation signal output section 141 allows the floating diffusions FD[3] and FD[4] to accumulate a charge equivalent to the background light received by the photoelectric conversion elements PD[3] and PD[4] for the time equivalent to the pulse width Tp.

According to the embodiment, the distance D is detected within the range 0≦D≦(c×Tp/2). The light emitting section 10 emits the pulsed light having the corresponding intensity. No pulsed light is emitted until emission of the next pulsed light from a time point after the lapse of time 2×Tp from the time point for emitting the most recent pulsed light.

When completing the emission of the pulsed light for the specified number of times, the standard distance image generation signal output section 141 supplies the activated instruction signal RG to the pixel generating units 27 in order. The standard distance image generation signal output section 141 allows the pixel generating unit 27 to output a value corresponding to the charge stored in the floating diffusion FD. The standard distance image generation signal output section 141 allows the writing section 29 to write the output value to the output data storage section 30.

There has been described one signal output operation performed by the standard distance image generation signal output section 141. The standard distance image generation signal output section 141 repeats this signal output operation until the signal generating section 140 stops that section 141.

Figure 17:
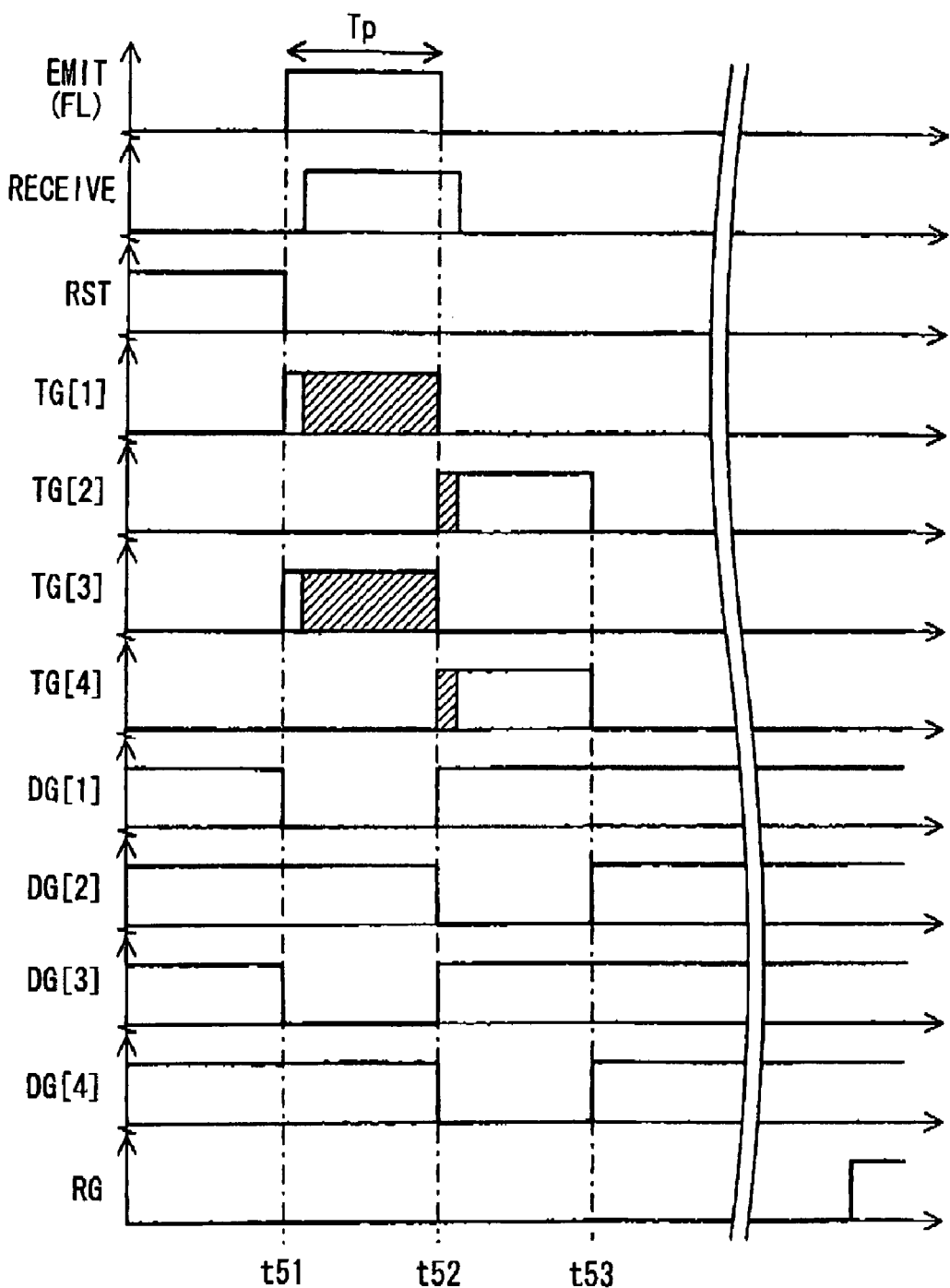
FIG. 17 is a time chart showing a pattern of signals output from a divided distance image generation signal output section according to the fourth embodiment.

The divided distance image generation signal output section 143 outputs a pattern of the light emitting signal FL, the instruction signals RST, TG[1] through TG[4], DG[1] through DG[4], and RG as shown in FIG. 17. The divided distance image generation signal output section 143 supplies the light emitting signal FL to the drive circuit of the light emitting section 10. The divided distance image generation signal output section 143 supplies the instruction signals RST, TG[1] through TG[4], DG[1] through DG[4], and RG to the photoelectric sensor 21. FIG. 17 is a time chart showing the pattern of the light emitting signal FL, the instruction signals RST, TG[1] through TG[4], DG[1] through DG[4], and RG output from the divided distance image generation signal output section 143.

With reference to FIG. 17, as the start, the divided distance image generation signal output section 143 is initiated and starts a signal output operation. The divided distance image generation signal output section 143 first activates the reset instruction signal RST and the discharge instruction signals DG[1] through DG[4]. The divided distance image generation signal output section 143 inactivates the other instruction signals TG[1] through TG[4], and RG. The divided distance image generation signal output section 143 supplies the activated or inactivated instruction signals RST, TG[1] through TG[4], DG[1] through DG[4], and RG to the photoelectric sensor 21. This operation turns on the discharge transistor Tr1 and the reset transistor Tr5 in each pixel generating unit 27 included in the photoelectric sensor 21. The photoelectric conversion element PD and the floating diffusion FD are initialized.

At specified time t51 after activating the reset instruction signal RST, the divided distance image generation signal output section 143 starts supplying the light emitting section 10 with the light emitting signal FL, i.e., a pulse signal (rectangular signal) having pulse width Tp in a cycle of (2×Tp+β), where β is a positive value including zero defined by a designer.

When the pulse signal is input to the drive circuit of the light emitting section 10, the light emitting section 10 accordingly emits pulsed light having pulse width Tp in a cycle of (2×Tp+β). Though not shown in FIG. 17, the divided distance image generation signal output section 143 supplies multiple light emitting signals FL to the light emitting section 10 as a signal output operation for generating one piece of distance image data. Accordingly, one signal output operation emits the pulsed light more than once.

The divided distance image generation signal output section 143 inactivates the reset instruction signal RST at time t51 to start emitting the first pulsed light that is to be emitted more than once. In synchronization with emission of the pulsed light, the divided distance image generation signal output section 143 inactivates the discharge instruction signals DG[1] and DG[3] and activates the charge transfer instruction signals TG[1] and TG[3]. At time t51, the floating diffusion FD[1] starts accumulating a charge generated by the photoelectric conversion element PD[1]. The floating diffusion FD[3] starts accumulating a charge generated by the photoelectric conversion element PD[3].

At time t52, the divided distance image generation signal output section 143 inactivates the charge transfer instruction signals TG[1] and TG[3], activates the discharge instruction signals DG[1] and DG[3], activates the charge transfer instruction signals TG[2] and TG[4], and inactivates the discharge instructions signal DG[2] and DG[4]. Time t52 occurs by a time interval equivalent to the pulse width Tp later than the time to emit the pulsed light.

At time t52, the floating diffusion FD[1] for the first pixel generating unit 27 in each pixel set 25 completes accumulating a charge generated by the photoelectric conversion element PD[1]. The floating diffusion FD[3] for the third pixel generating unit 27 in each pixel set 25 completes accumulating a charge generated by the photoelectric conversion element PD[3].

At time t52, the floating diffusion FD[2] for the second pixel generating unit 27 in each pixel set 25 starts accumulating a charge generated by the photoelectric conversion element PD[2]. The floating diffusion FD[4] for the fourth pixel generating unit 27 in each pixel set 25 starts accumulating a charge generated by the photoelectric conversion element PD[4].

At time t53, the divided distance image generation signal output section 143 inactivates the charge transfer instruction signals TG[2] and TG[4] and activates the discharge instruction signals DG[2] and DG[4]. Time t53 occurs 2×Tp later than the time to emit the pulsed light.

At time t53, the floating diffusion FD[2] for the second pixel generating unit 27 in each pixel set 25 completes accumulating a charge generated by the photoelectric conversion element PD[2]. The floating diffusion FD[4] for the fourth pixel generating unit 27 in each pixel set 25 completes accumulating a charge generated by the photoelectric conversion element PD[4].

After a lapse of time interval β from time t53, the divided distance image generation signal output section 143 allows the light emitting section 10 to emit the next pulsed light in accordance with light emitting signal FL. Simultaneously with the emission of the pulsed light, the divided distance image generation signal output section 143 supplies the photoelectric sensor 21 with the instruction signals TG[1] through TG[4] and DG[1] through DG[4] in the same pattern as that for time t51 through time t53 as mentioned above.

Each time the pulsed light is emitted, the divided distance image generation signal output section 143 allows the floating diffusions FD[1] and FD[3] to accumulate a charge generated by the photoelectric conversion elements PD[1] and PD[3] for the time equivalent to pulse width Tp from the time point of the emission. The divided distance image generation signal output section 143 allows the floating diffusions FD[2] and FD[4] to accumulate a charge generated by the photoelectric conversion elements PD[2] and PD[4] for the time equivalent to pulse width Tp after the lapse of time Tp from the time point of the emission.

When the light emitting section 10 and the light receiving section 20 are controlled as mentioned above, the emitted light reflects on the subject 5 and returns as reflected light that deviates from the emitted light for phase φ. The floating diffusions FD[1] through FD[4] accumulate charges corresponding to the amount of reflected light received during periods as shaded in FIG. 17.

When completing the emission of the pulsed light for the specified number of times, the divided distance image generation signal output section 143 supplies the activated instruction signal RG to the pixel generating units 27 in order. The standard distance image generation signal output section 141 allows the pixel generating unit 27 to output a value corresponding to the charge stored in the floating diffusion FD. The divided distance image generation signal output section 143 allows the writing section 29 to write the output value to the output data storage section 30.

There has been described one signal output operation performed by the divided distance image generation signal output section 143. The divided distance image generation signal output section 143 repeats this signal output operation until the section 143 stops.

Similarly to the first embodiment, the normal image generation signal output section 45 according to the embodiment supplies the photoelectric sensor 21 with the pattern of instruction signals RST, TG[1] through TG[4], DG[1] through DG[4], and RG as shown in FIG. 7.

Figure 18:
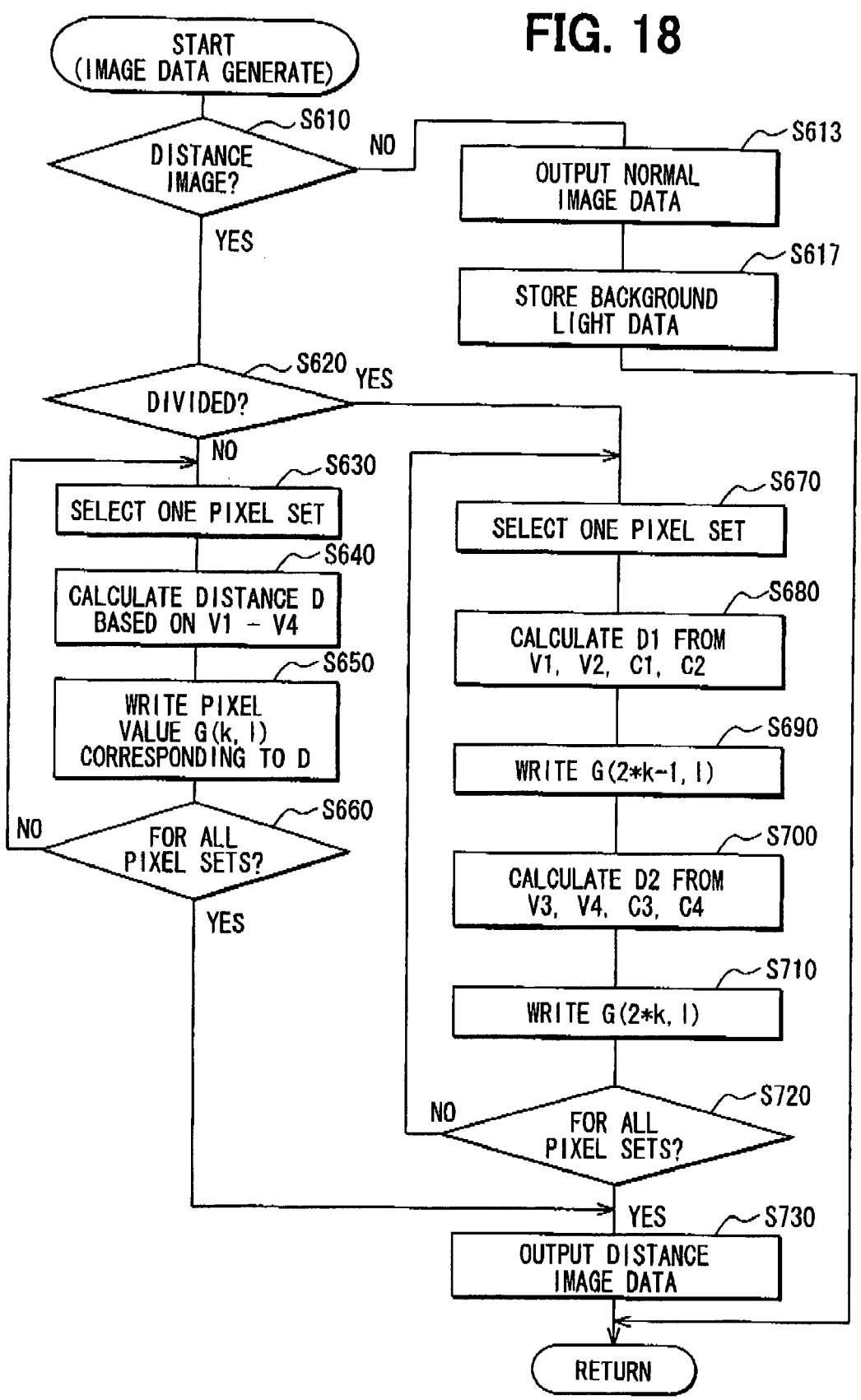
FIG. 18 is a flowchart showing an image data generation and output process performed by the control section according to the fourth embodiment.

With reference to FIG. 18, the following describes image data generation and output process performed by the control section 60 in the image data generating device 100 according to the embodiment. FIG. 18 is a flowchart showing the image data generation and output process repeatedly performed by the control section 60 during operations of the image data generating device 100.

When starting the image data generation and output process in FIG. 18, the control section 60 determines whether or not the operation mode is set to the standard distance image mode or the divided distance image mode (Step S610). The mode selection function 60b selects the operation mode as mentioned above.

The control section 60 proceeds to Step S620 when determining at Step S610 that the operation mode is set to the standard distance image mode or the divided distance image mode (Yes at Step S610). The control section 60 proceeds to Step S613 when determining that the operation mode is set to the normal image mode (No at Step S610).

At Step S613, similarly to Step S115 of the first embodiment, the control section 60 reads an output value for each pixel generating unit 27 as output data from the output data storage section 30. The control section 60 assumes a pixel value corresponding to the output value to be a pixel value for a coordinate corresponding to the pixel generating unit 27 and generates plane image data. The control section 60 outputs the plane image data via the interface section 70 and provides the data to the data processing device 80.

When the process at Step S613 is complete, the control section 60 proceeds to Step S617 and temporarily stores the output data read from the output data storage section 30, i.e., a group of output values for the pixel generating units 27 in a background light data storage area of the RAM. The output values stored in the background light data storage area are used to generate distance image data.

When the process at Step S617 is complete, the control section 60 once terminates the image data generation and output process. The control section 60 reperforms the image data generation and output process from Step S610 in accordance with a cycle of the signal output operation in the signal generating section 140 to repeatedly generate and output image data.

At Step S620, the control section 60 determines whether or not the divided distance image mode is selected as the operation mode of the image data generation and output process. The control section 60 proceeds to Step S670 when determining that the divided distance image mode is selected as the operation mode (Yes at Step S620). The control section 60 proceeds to Step S630 when determining that the standard distance image mode is selected as the operation mode (No at Step S620).

At Step S630, the control section 60 selects one of the pixel sets 25 included in the pixel array 23 so as to process it. The selected pixel set 25 to be processed includes the first, second, third, and fourth pixel generating units 27. The control section 60 reads output value V1 for the first pixel generating unit 27, output value V2 for the second one, output value V3 for the third one, and output value V4 for the fourth one from the output data storage section 30. Based on the output values V1, V2, V3, and V4, the control section 60 calculates distance D to the subject 5 using the following equation (Step S640).

$$D=(\tfrac{1}{2})\times c\times Tp\times(V2-V3)/(V1+V2-V3-V4) \quad (14)$$

Figure 19A:
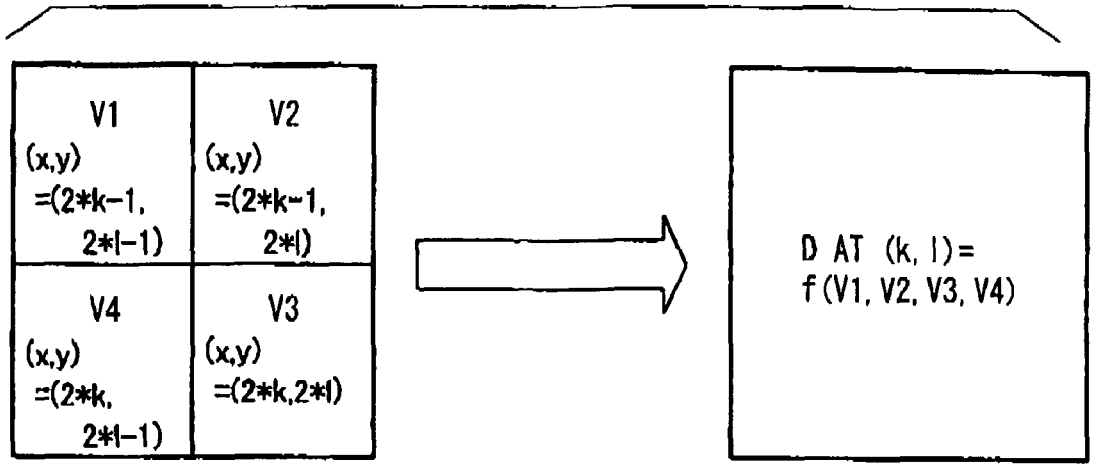
FIG. 19A is an explanatory diagram showing a method of calculating the distance D in standard distance image mode according to the fourth embodiment.

FIG. 19A is an explanatory diagram showing a method of calculating the distance D in the standard distance image mode. After calculating the distance D at Step S640, the control section 60 proceeds to Step S650. Similarly to Step S150 of the first embodiment, the control section 60 converts the calculated distance D into a shading value representing pixel shading. The control section 60 assumes the shading value to be a pixel value at the coordinate corresponding to the pixel set 25 to be processed for calculating the distance D and writes the value to the distance image data generation area in the RAM.

When the process at Step S650 is complete, the control section 60 determines whether or not pixel values have been written for all the pixel sets 25 included in the pixel array 23 (Step S660). The control section 60 proceeds to Step S630 when determining that pixel values are not written for all the pixel sets 25 (No at Step S660). The control section 60 selects one of the pixel sets 25 corresponding to unwritten pixel values so as to process it. The control section 60 performs the process at Steps S640 and S650 on the selected pixel set 25. Again, at Step S660, the control section 60 determines whether or not pixel values are written for all the pixel sets 25.

The control section 60 repeats the above-mentioned operation to calculate the distance D from the output value for the pixel set 25 at the coordinate (k, l) where k ranges from 1 to K and l ranges from 1 to L. The control section 60 writes the shading value corresponding to the distance D as a pixel value G(k, l) at the coordinate (k, l) to the RAM and completes the distance image data of K rows and L columns.

The control section 60 proceeds to Step S730 when pixel values for all the pixel sets 25 have been written to complete the distance image data of K rows and L columns. The control section 60 outputs the distance image data via the interface section 70. The distance image data is supplied to the data processing device 80. The control section 60 once terminates the image data generation and output process. The control section 60 reperforms the image data generation and output process from Step S610 in accordance with a cycle of the signal output operation in the signal generating section 140 to repeatedly generate and output image data.

At Step S670, the control section 60 selects one of the pixel sets 25 included in the pixel array 23 so as to process it. The selected pixel set 25 to be processed includes the first and second pixel generating units 27. The control section 60 reads output value V1 for the first pixel generating unit 27 and output value V2 for the second one. The background light data storage area of the RAM stores output values C1 and C2 for the first and second pixel generating units 27, respectively. The control section 60 calculates the distance D to the subject 5 using the following equation based on the output values V1, V2, C1, and C2 (Step S680).

$$D=(\tfrac{1}{2})\times c\times Tp\times(V2-C2)/(V1+V2-C1-C2) \quad (15)$$

After completing this process, the control section 60 converts the calculated distance D into a shading value representing pixel shading. The control section 60 assumes the shading value to be a pixel value at the coordinate corresponding to the set of pixel generating units 27 for calculating the distance D and writes the value to the distance image data generation area in the RAM (Step S690).

According to the embodiment, it is assumed that the pixel set 25 at coordinate (k, l) is to be processed. The pixel set 25 at coordinate (k, l) includes the first and second pixel generating units 27 that correspond to the output values V1 and V2, respectively. The background light data storage area stores the values C1 and C2 that are output from the first and second pixel generating units 27 respectively in the pixel set 25 at coordinate (k, l) during the operation in the normal image mode. The control section 60 calculates the distance D using the equation (15) based on the values V1, V2, C1, and C2. The control section 60 writes a shading value corresponding to the calculated distance D as a pixel value at coordinate (2×k−1, l) to the distance image data generation area in the RAM.

After completing the process at Step S690, the control section 60 proceeds to Step S700. The pixel set 25 to be processed includes the third and fourth pixel generating units 27 that correspond to the third and fourth output values V3 and V4, respectively. The control section 60 reads the output values V3 and V4 from the output data storage section 30. The background light data storage area of the RAM stores the output values C3 and C4 for the third and fourth pixel generating units 27, respectively. The control section 60 calculates the distance D to the subject 5 using the following equation based on the values V3, V4, C3, and C4.

$$D=(\tfrac{1}{2}) \times c \times Tp \times (V4-C4)/(V3+V4-C3-C4) \quad (16)$$

Figure 19B:
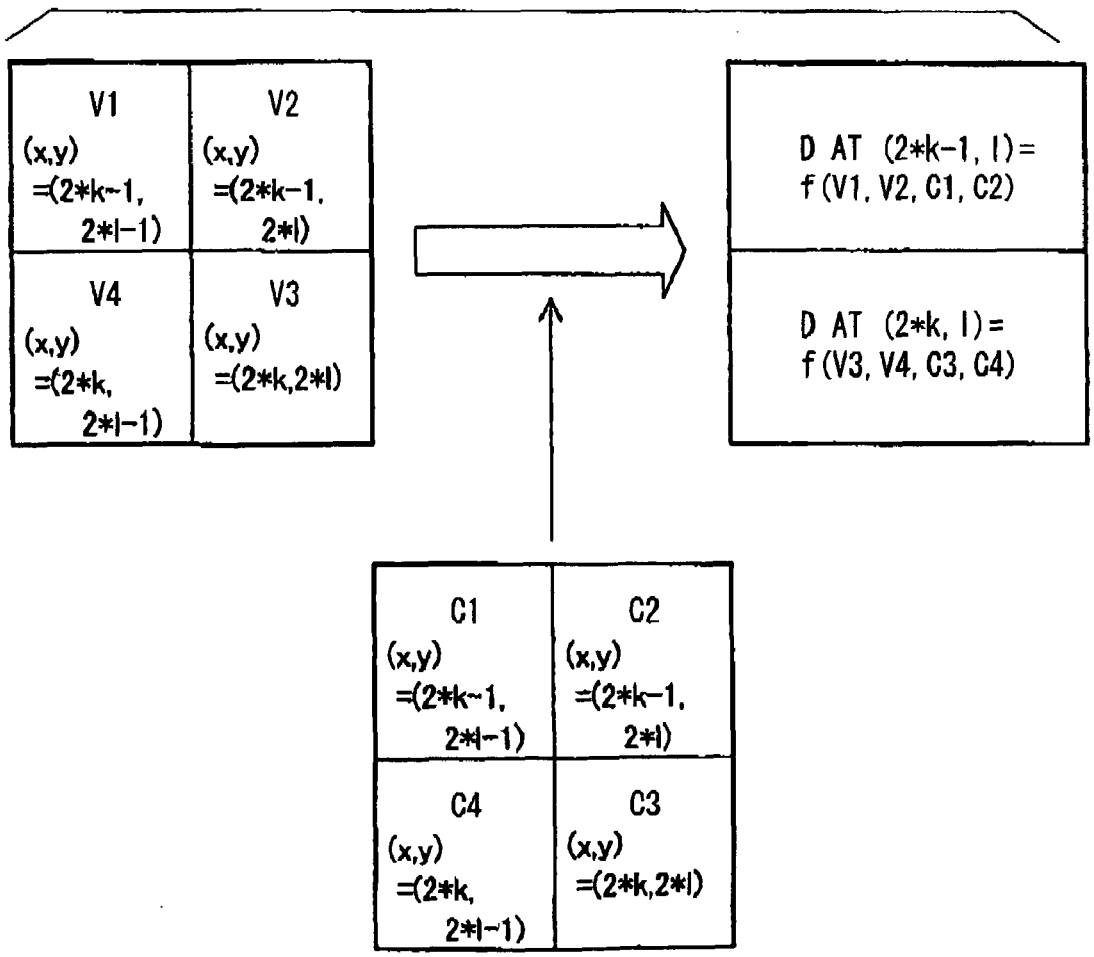
FIG. 19B is an explanatory diagram showing a method of calculating the distance D in divided distance image mode according to the fourth embodiment.

FIG. 19B is an explanatory diagram showing a method of calculating the distance D in the divided distance image mode.

After completing that process, the control section 60 converts the calculated distance D into a shading value representing pixel shading. The control section 60 assumes the shading value to be a pixel value at the coordinate corresponding to the set of pixel generating units 27 for calculating the distance D and writes the value to the distance image data generation area in the RAM (Step S710).

According to the embodiment, it is assumed that the pixel set 25 at coordinate (k, l) is to be processed. The pixel set 25 at coordinate (k, l) includes the third and fourth pixel generating units 27 that correspond to the output values V3 and V4, respectively. The background light data storage area stores the values C3 and C4 that are output from the third and fourth pixel generating units 27 respectively in the pixel set 25 at coordinate (k, l) during the operation in the normal image mode. The control section 60 calculates the distance D using the equation (16) based on the values V3, V4, C3, and C4. The control section 60 writes a shading value corresponding to the calculated distance D as a pixel value at coordinate (2k, l) to the distance image data generation area in the RAM.

After completing the process at Step S710, the control section 60 proceeds to Step S720. The control section 60 determines whether or not pixel values have been written for all the pixel sets 25 included in the pixel array 23. The control section 60 proceeds to Step S670 when determining that pixel values are not written for all the pixel sets 25 (No at Step S720). The control section 60 selects one of the pixel sets 25 corresponding to unwritten pixel values so as to process it. The control section 60 performs the process at Steps S680 and S710 on the selected pixel set 25. Again, at Step S720, the control section 60 determines whether or not pixel values are written for all the pixel sets 25.

The control section 60 repeats the above-mentioned operation to calculate the distance D from the output values V1 and V2 for the pixel set 25 at the coordinate (k, l) where k ranges from 1 to K and l ranges from 1 to L. The control section 60 writes the shading value corresponding to the distance D as a pixel value at the coordinate (2×k−1, l) to the RAM. In addition, the control section 60 calculates the distance D from the output values V3 and V4 for the pixel set 25 at the coordinate (k, l). The control section 60 writes the shading value corresponding to the distance d as a pixel value at the coordinate (2×k, l) to the RAM and completes the distance image data of (2×K) rows and L columns.

The control section 60 proceeds to Step S730 when pixel values for all the pixel sets 25 have been written to complete the distance image data of (2×K) rows and L columns (Yes at Step S720). The control section 60 outputs the distance image data via the interface section 70. The distance image data is supplied to the data processing device 80. The control section 60 once terminates the image data generation and output process. The control section 60 reperforms the image data generation and output process from Step S610 in accordance with a cycle of the signal output operation in the signal generating section 140 to repeatedly generate and output image data.

When the normal image mode is selected as the operation mode, the control section 60 repeatedly reads the output data stored in the output data storage section 30 based on the signal output operation of the signal generating section 140 to generate and output plane image data. When the standard distance image mode is selected as the operation mode, the control section 60 repeatedly generates and outputs standard-resolution distance image data based on the signal output operation of the signal generating section 140. When the divided distance image mode is selected as the operation mode, the control section 60 repeatedly generates and outputs high-resolution distance image data based on the signal output operation of the signal generating section 140.

There have been described the operations of the image data generating device 100 according to the fourth embodiment. The image data generating device 100 according to the fourth embodiment selects a set of pixel generating units 27 used for the distance calculation and selects the high resolution for the distance image data in accordance with an instruction from the outside. The embodiment can provide the external data processing device 80 with distance image data adjusted to an optimal resolution.

The signal output operations of the distance image generation signal output section 141 and the divided distance image generation signal output section 143 included in the signal generating section 140 and the process at Steps S620 through S730 performed by the control section 60 may include or function as a distance image data generation means or unit. The signal output operation of the normal image generation signal output section 45 included in the signal generating section 140 and the process at Step S613 performed by the control section 60 may include or function as a plane image data generation means or unit. The mode selection function 60b of the control section 60 may include or function as an operation control means or unit. The process at Step S617 performed by the control section 60 may include or function as a cancel quantity setup means or unit.

(Modifications)

While there have been described the specific preferred embodiments of the present invention, it is to be distinctly understood that the present invention is not limited thereto but may be otherwise variously embodied within the spirit and scope of the invention.

For example, the light emitting section 10 may use a laser diode (LD) instead of the light emitting diode (LED) as described in the embodiments.

Further, each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

(Aspects of Disclosure)

Aspects of the disclosure described herein are set out in the following clauses.

As an aspect, an image data generating device comprises: a light emitting device which emits light; a light receiving device which receives incident light from the outside including light that is emitted from the light emitting device and is reflected on a subject to return to the device; a distance image data generation unit which finds a distance to a subject by controlling the light emitting device and the light receiving device and generates distance image data representing the distance; a plane image data generation unit which controls the light receiving device and generates plane image data representing a subjects plane image; and an operation control unit selectively operates the distance image data generation unit and the plane image data generation unit. The light receiving device, the distance image data generation unit, and the plane image data generation unit are constructed as follows.

In the image data generating device, the light receiving device includes an array of multiple pixel generating units each of which has one photoelectric conversion section for converting incident light into a charge and one pixel output section. The pixel output section includes a floating diffusion for accumulating a charge generated by the photoelectric conversion section in the unit. The pixel output section discharges and discards a charge generated by the photoelectric conversion section in accordance with a discharge instruction signal supplied from the outside. The pixel output section transfers a charge generated by the photoelectric conversion section to the floating diffusion in accordance with a charge transfer instruction signal supplied from the outside. The pixel output section outputs a value equivalent to a charge accumulated in the floating diffusion.

A set of pixel generating units is equivalent to a group of pixel generating units included in the light receiving device. The distance image data generation unit calculates a distance to a subject for each set of pixel generating units based on output values for the pixel generating units in the set. The distance image data generation unit represents a value corresponding to the calculated distance as a pixel value for a coordinate corresponding to the set of pixel generating units and generates distance image data.

In contrast, the plane image data generation unit describes a value corresponding to an output value for each of the pixel generating units as a pixel value for a coordinate corresponding to the pixel generating unit and generates image data representing a subject's plane image.

The image data generating device generates plane image data by finding a pixel value per pixel (or pixel unit) from output values for the pixel generating units. The image data generating device generates distance image data by finding a distance from output values for a set of pixel generating units on a set basis and calculating a pixel value per pixel set.

Conventionally, a light receiving operation needs to be performed more than once per light emission operation during different time periods to find a phase difference between emitted light and reflected light based on the amount of light received. Accordingly, a conventional distance image data generating device uses a pixel generating unit that includes multiple floating diffusions corresponding to one photoelectric conversion section.

The pixel generating unit according to the above-mentioned construction requires a large circuit around the photoelectric conversion section so that the floating diffusion can output a value equivalent to a charge generated by the photoelectric conversion section. This makes it difficult to densely lay out the photoelectric conversion section. As a result, the light receiving device generates plane image data at a lower resolution than that of data generated by a dedicated device.

To solve this problem, distance image data is generated by controlling a set of pixel generating units and calculating a distance from an output value for each set. Differently from a conventional technique, the need is eliminated for laying out a distance image data generation circuit not used for plane image data generation around each photoelectric conversion section in the light receiving device. A distance can be calculated without needing for constructing the pixel generating unit so that multiple floating diffusions are provided for one photoelectric conversion section. The present technique can find a phase difference between emitted light and reflected light even though the photoelectric conversion section is provided with only one pixel output section containing the floating diffusion.

The photoelectric conversion section can be densely laid out. When the image data generating device has functions of generating distance image data and plane image data, the common light receiving device can be used to generate plane image data at a higher resolution than the conventional technique.

The set of pixel generating units used for distance calculation may be fixed or variable. The distance image data generation unit may select any of sets of grouped pixel generating units included in the light receiving device.

One pixel generating unit in a set needs to be operated in specific relation to another pixel generating unit in the set so as to find a distance to a subject based on output values for the pixel generating units. That relation can be realized by supplying the pixel generating unit in the set with instruction signals having the specific relation.

In other words, the image data generating device can select an input pattern of instruction signals to easily select a set of pixel generating units used for the distance calculation. When provided with a function of selecting an input pattern of instruction signals, the distance image data generation unit can easily change different sets to thereby select a set of pixel generating units used for the distance calculation.

To calculate a distance from the set of pixel generating units, the light receiving device needs to be controlled so that the pixel generating units in the set output values equivalent to charges generated by the photoelectric conversion section during different periods of receiving reflected light resulting from emitted light.

The distance image data generation unit may supply the pixel generating units with a discharge instruction signal and a transfer instruction signal so that the pixel generating units in the set output values equivalent to charges generated by the photoelectric conversion sections during different periods of receiving the reflected light resulting from the light emitted from the light emitting device. The distance image data generation unit may control the light receiving device, find a phase difference between the incident light and the emitted light from the light emitting device for each set of pixel generating units based on output values for the pixel generating units in the set, and calculate a distance to the subject. Specifically, the distance image data generation unit may be constructed as follows.

For example, let us consider a set of four pixel generating units. The distance image data generation unit controls the light emitting device to emit pulsed light having pulse width Tp. Each time the pulsed light is emitted, the distance image data generation unit may control the light receiving device as follows. The first pixel generating unit in the set allows the floating diffusion to accumulate a charge generated by the photoelectric conversion section during a time interval equivalent to pulse width Tp from the time to emit the pulsed light (e.g., called an emit start time). The second pixel generating unit allows the floating diffusion to accumulate a charge generated by the photoelectric conversion section during a time interval equivalent to pulse width Tp after a delay of half the pulse width Tp (Tp/2) from the time to emit the pulsed light. The third pixel generating unit allows the floating diffusion to accumulate a charge generated by the photoelectric conversion section during a time interval equivalent to pulse width Tp after a delay of pulse width Tp from the time to emit the pulsed light. The fourth pixel generating unit allows the floating diffusion to accumulate a charge generated by the photoelectric conversion section during a time interval equivalent to pulse width Tp after a delay of three halves pulse width Tp (3×Tp/2) from the time to emit the pulsed light.

When operating the pixel generating units in the set as described above, the distance image data generation unit can calculate phase difference $\phi$ using the following equation based on output values V1, V2, V3, and V4 for the first, second, third, and fourth pixel generating units, respectively.

$$\phi = \arctan((V2-V4)/(V1-V3)) \tag{1}$$

The distance image data generation unit can calculate distance D to the subject for each set of pixel generating units using the following equation, where c denotes the light speed.

$$D = c \times Tp \times \phi/(2\pi) \tag{2}$$

When the set of four pixel generating units is used, the distance image data generation unit may be constructed as follows. The distance image data generation unit controls the light emitting device to emit sine-modulated light that is amplitude-modulated by a sine wave. In addition, the distance image data generation unit controls the light receiving device as follows. The first pixel generating unit allows the floating diffusion to accumulate a charge generated by the photoelectric conversion section within a specified time interval around a reference time point that provides an initial phase to the sine-modulated light emitted from the light emitting device. The second pixel generating unit allows the floating diffusion to accumulate a charge generated by the photoelectric conversion section within a specified time interval around a time point by phase $\pi/2$ later than the reference time point. The third pixel generating unit allows the floating diffusion to accumulate a charge generated by the photoelectric conversion section within a specified time interval around a time point by phase $\pi$ later than the reference time point. The fourth pixel generating unit allows the floating diffusion to accumulate a charge generated by the photoelectric conversion section within a specified time interval around a time point by phase $3\pi/2$ later than the reference time point.

Even when operating the pixel generating units in the set as mentioned above, the distance image data generation unit can calculate a distance to the subject based on output values for the first to fourth pixel generating units.

At the reference time point where the sine-modulated light becomes phase zero, the distance image data generation unit can calculate phase difference $\phi$ using the following equation based on output values V1, V2, V3, and V4 for the first, second, third, and fourth pixel generating units, respectively, $$\phi = \arctan((V3-V1)/(V2-V4)) \tag{3}$$

The distance image data generation unit can calculate distance D to the subject using the following equation, where c denotes a light speed and Tc denotes the sine-modulated light cycle.

$$D = c \times (Tc/2) \times \phi/(2\pi) \tag{4}$$

When a set of fewer than four pixel generating units is used, the distance image data generation unit may be constructed as follows to calculate distance D from the set of pixel generating units.

The distance image data generation unit allows the light emitting device to emit pulsed light having pulse width Tp. Each time the pulsed light is emitted, the distance image data generation unit controls the light receiving device and its pixel generating units in the set as follows. The first pixel generating unit allows the floating diffusion to accumulate a charge generated by the photoelectric conversion section during a time interval equivalent to pulse width Tp from the time to emit the pulsed light. The second pixel generating unit allows the floating diffusion to accumulate a charge generated by the photoelectric conversion section during a time interval equivalent to pulse width Tp after a delay of pulse width Tp from the time to emit the pulsed light. Another pixel generating unit other than the first and second ones in the set allows the floating diffusion to accumulate a charge generated by the photoelectric conversion section during a time interval when the light receiving device does not receive the reflected light corresponding to the light emitted from the light emitting device. According to this construction, the distance image data generation unit can calculate distance D from the set of pixel generating units.

When operating the pixel generating units in the set as described above, the distance image data generation unit can find values <V1> and <V2>, where <V1> denotes output value V1 for the first pixel generating unit except a background light component based on an output value for the pixel generating unit other than the first and second ones and <V2> denotes output value V2 for the second pixel generating unit except the background light component. The distance image data generation unit can find distance D to the subject using the following equation, where c denotes the light speed.

$$D = (\tfrac{1}{2}) \times c \times Tp \times <V2>/(<V1>+<V2>) \tag{5}$$

This technique can be applied to the construction that uses a set of three or more pixel generating units.

When plane image data is generated, the photoelectric conversion section generates a charge equivalent to the background light component described here. When the plane image data generation unit generates plane image data, the distance image data generating device can be constructed so that the distance image data generation unit is supplied with a background light component for each pixel generating unit based on the output value acquired from the pixel generating unit. In this manner, the technique can calculate distance D to the subject even when the set contains two pixel generating units.

The above-mentioned image data generating device may include a cancel quantity setup unit when the plane image data generation unit generates plane image data. The cancel quantity setup unit provides the distance image data generation unit with a background light component for each pixel generating unit based on an output value resulting from the unit. In this case, the distance image data generation unit finds values <V1> and <V2>, where <V1> denotes the output value V1 for the first pixel generating unit except the background light component defined by the cancel quantity setup unit and <V2> denotes the output value V2 for the second pixel generating unit except the background light component defined by the cancel quantity setup unit. The distance image data generation unit then calculates distance D to the subject using equation (5). In this manner, the distance image data generation unit can calculate distance D to the subject even when the above-mentioned technique controls the light receiving device using the set of two pixel generating units.

The technique provides the cancel quantity setup unit, eliminates the background light component defined by the cancel quantity setup unit from an output value for each pixel generating unit, and calculates a distance to the subject based on the output value with the background light component eliminated. The technique can be applied to various types of the image generating device.

The image data generating device may calculate a distance by controlling sets of pixel generating units in order on a set basis. It may be more preferable to simultaneously control the sets of pixel generating units, making it possible to fast generate distance image data.

According to a preferred construction, the light receiving device includes pixel generating units that are grouped as sets. Each set contains the same number of pixel generating units. The distance image data generation unit calculates a distance to the subject based on output values for the pixel generating units in each set. The distance image data generation unit describes a value corresponding to the calculated distance as a pixel value for a coordinate corresponding to the set of pixel generating units and thus generates distance image data. In addition, the light receiving device is assumed to contain sets of pixel generating units that total to S. Assuming that reference symbol i ranges from 1 to S, the i-th pixel generating units in other sets simultaneously perform the same operation. In a given time period, the light receiving device can emit light and receive its reflected light. The pixel generating units in the set output values corresponding to charges generated by the photoelectric conversion sections during different time periods. To do this, the light receiving device is controlled so that the pixel generating units are supplied with a discharge instruction signal and a charge transfer instruction signal.

When the image data generating device includes the distance image data generation unit constructed as mentioned above, the same technique can be used to simultaneously control the sets of pixel generating units and fast generate distance image data.

To construct the distance image data generation unit, the light receiving device only needs to be constructed as follows.

The light receiving device includes multiple pixel sets. Each pixel set is a set of pixel generating units the number of which is represented as S. A transmission path La transmits a discharge instruction signal supplied from the outside to pixel generating units in each pixel set. The transmission path La is common to the pixel sets and is provided for the i-th to the S-th pixel generating units included in the pixel set. Here, the reference symbol i ranges from 1 to S. A transmission path Lb transmits a charge transfer instruction signal supplied from the outside to pixel generating units in each pixel set. The transmission path Lb is common to the pixel sets and is provided for the i-th to the S-th pixel generating units included in the pixel set. The common discharge instruction signal is supplied from the outside to the i-th pixel generating unit in each pixel set via the transmission path La for the i-th pixel generating unit. The common charge transfer instruction signal is supplied from the outside to the i-th pixel generating unit in each pixel set via the transmission path Lb for the i-th pixel generating unit.

The image data generating device includes the light receiving device that is constructed as mentioned above. The discharge instruction signal is supplied from the outside to an input terminal of the transmission path La for the i-th pixel generating unit so that the signal is used for this unit. The charge transfer instruction signal is supplied from the outside to an input terminal of the transmission path Lb for the i-th pixel generating unit so that the signal is used for this unit. The light receiving device can be controlled simultaneously with the i-th pixel generating unit in each pixel set. The i-th pixel generating units in the pixel sets can perform the same operation at the same time.

When the light receiving device is constructed as mentioned above, the image data generating device can simultaneously control the sets of pixel generating units with ease.

It is more preferable to construct the image data generating device so as to be able to select resolutions of distance image data to be generated.

When the light receiving device includes pixel sets that are grouped as a set of pixel generating units, the distance image data generation unit may preferably provide standard mode and low resolution mode for these pixel sets. In the standard mode, for example, the distance image data generation unit calculates a distance to the subject for each of pixel sets. The distance image data generation unit represents a value corresponding to the calculated distance as a pixel value for a coordinate corresponding to the pixel set and generates distance image data. In the low resolution mode, the distance image data generation unit assumes a large pixel set, i.e., a set of pixel sets grouped in the light receiving device. The distance image data generation unit calculates a distance to the subject for each large pixel set based on output values for the pixel generating units included in the large pixel set. The distance image data generation unit represents a value corresponding to the calculated distance as a pixel value for a coordinate corresponding to the large pixel set and generates distance image data. The distance image data generation unit selects each of the modes according to need.

When the distance image data generation unit selects the mode in accordance with an instruction from the outside, the distance image data resolution can be conveniently changed from the standard resolution to the lower one.

In the image data generating device, the pixel set may be preferably constructed so that each pixel set contains the same number (S) of pixel generating units.

Further, in the image data generating device, the distance image data generation unit may be preferably constructed as follows. Assuming that reference symbol i ranges from 1 to S, the i-th pixel generating units in the pixel sets simultaneously perform the same operation in each of the modes. In a given time period, the light receiving device can emit light and receive its reflected light. The pixel generating units in the pixel set output values corresponding to charges generated by the photoelectric conversion section during different time periods. To do this, the light receiving device is controlled so that the pixel generating units are supplied with a discharge instruction signal and a charge transfer instruction signal. In the standard mode, the distance image data generation unit finds a phase difference between the incident light and the emitted light from the light emitting device for each pixel set based on output values for the pixel generating units included in the pixel set and calculates a distance to the subject. In the low resolution mode, the reference symbol i is assumed to range from 1 to S. Each large pixel set contains pixel sets each of which further contains pixel generating units. The distance image data generation unit accumulates output values for the i-th pixel generating units in the pixel sets and acquires integrated values for the i-th pixel generating units. Using the same technique as the standard mode, the distance image data generation unit calculates a distance to the subject based on the integrated values for the first through the S-th pixel generating units. The distance image data generation unit represents a value corresponding to the calculated distance as a pixel value for a coordinate corresponding to the large pixel set and generates distance image data.

The distance image data generation unit may be constructed to use high resolution mode instead of or in addition to the low resolution mode. In the high resolution mode, the distance image data generation unit divides the pixel set into the specified number of small pixel sets. The distance image data generation unit calculates a distance to the subject for each small pixel set based on output values for the pixel generating units contained in the small pixel set. The distance image data generation unit represents a value corresponding to the calculated distance as a pixel value for a coordinate corresponding to the small pixel set and generates distance image data. The image data generating device according to the above-mentioned construction can conveniently change the distance image data resolution from the standard resolution to the higher one.

The above-mentioned image data generating device can use a light receiving device that contains pixel generating units laid out in a matrix of (K×M) rows and (L×N) columns. The distance calculation can use a set of pixel generating units, i.e., a pixel set. The light receiving device contains a matrix of K×L pixel sets. The pixel set contains a set of pixel generating units of M rows and N columns.

When the image data generating device includes the light receiving device according to the above-mentioned construction, the distance image data generation unit may be constructed as follows.

The light receiving device contains a group of pixel generating units divided into a K×L matrix that contains sets of pixel generating units. Each set contains pixel generating units of M rows and N columns. The distance image data generation unit calculates a distance to the subject based on output values for the pixel generating units in each set. In addition, a center area of M rows and N columns is assumed correspondingly to the set of pixel generating units. It is assumed another set of pixel generating units belonging to an area of M rows and N columns shifted by $\Delta m$ rows from the center area, where $\Delta m$ is smaller than value M. It is assumed still another set of pixel generating units belonging to an area of M rows and N columns shifted by $\Delta n$ columns from the center area, where $\Delta n$ is smaller than value N. It is assumed yet another set of pixel generating units belonging to an area of M rows and N columns shifted by $\Delta m$ rows and $\Delta n$ columns from the center area. The distance image data generation unit calculates a distance to the subject based on output values for the pixel generating units in part or all of the sets. The distance image data generation unit corrects the distance acquired from the set of pixel generating units in the center area based on a result of calculating distances from the sets of pixel generating units around the center area. The distance image data generation unit represents a value corresponding to the corrected distance as a pixel value for a coordinate corresponding to the set of pixel generating units in the center area and generates distance image data.

When generating distance image data, the image data generating device according to the above-mentioned construction finds a pixel value by correcting a distance value acquired from the pixel generating unit in the center area against a distance value acquired from the set of pixel generating units around it. It is possible to generate clear distance image data hardly affected by a noise.

As another aspect, a light receiving device includes multiple pixel generating units each of which includes only one pixel output section corresponding to a photoelectric conversion section. The light receiving device can densely lay out the photoelectric conversion section, making it possible to construct the data processing device capable of plane image data at a higher resolution than before.

Specifically, the pixel output section can include a floating diffusion, a discharge section, a charge transfer section, an output section, and a reset section. The discharge section discharges and discards a charge generated by the photoelectric conversion section from it in accordance with a discharge instruction signal supplied from the outside. The charge transfer section is provided between the photoelectric conversion section and the floating diffusion and transfers a charge generated by the photoelectric conversion section to the floating diffusion in accordance with a charge transfer instruction signal supplied from the outside. The output section outputs a value corresponding to a charge accumulated by the floating diffusion in accordance with an output instruction signal supplied from the outside. The reset section initializes the floating diffusion in accordance with a reset instruction signal supplied from the outside.

The light receiving device having the pixel output section receives the discharge, charge transfer, output, and reset instruction signals from the outside. The light receiving device can easily accumulate a charge generated by the photoelectric conversion section in the floating diffusion during a given period and detect the amount of light received from the outside during the period.

A CMOS structure can be used for the pixel output section. Transistors can be used for the discharge section, the charge transfer section, the output section, and the reset section.

Specifically, the pixel output section can include a discharge transistor, a charge transfer transistor, a conversion transistor, an output transistor, and a reset transistor. The discharge transistor turns on or off in accordance with the discharge instruction signal supplied from the outside via a gate electrode. The discharge transistor discharges and discards a charge generated by the photoelectric conversion section from it and initializes the photoelectric conversion section. The charge transfer transistor is provided between the photoelectric conversion section and the floating diffusion. The charge transfer transistor turns on or off in accordance with the charge transfer instruction signal supplied from the outside via a gate electrode and transfers a charge generated by the photoelectric conversion section to the floating diffusion. The conversion transistor converts a charge accumulated in the floating diffusion into a voltage value. The output transistor turns on or off in accordance with the output instruction signal supplied from the outside via a gate electrode. The output transistor outputs the voltage value converted by the conversion transistor as a value corresponding to the charge accumulated in the floating diffusion. The reset transistor turns on or off in accordance with the reset instruction signal supplied from the outside via a gate electrode and initializes the floating diffusion.

The light receiving device includes pixel generating units that are grouped as a pixel set. The pixel set contains pixel generating units the number of which is represented as S. The light receiving device can contain multiple pixel sets each of which contains as many as S pixel generating units.

When the light receiving device is constructed as mentioned above, the light receiving device can include transmission paths (signal lines) as follows for accepting various instruction signals supplied from the outside and transmitting them to the pixel set. That is, the light receiving device includes transmission paths La, Lb, and Lc. The transmission path La transmits the discharge instruction signal supplied from the outside to the pixel generating unit included in each pixel set. The transmission path La is common to the pixel sets and is provided for each of the first through the S-th pixel generating units included in the pixel sets. The transmission path Lb transmits the charge transfer instruction signal supplied from the outside to the pixel generating unit included in each pixel set. The transmission path Lb is common to the pixel sets and is provided for each of the first through the S-th pixel generating units included in the pixel sets. The transmission path Lc transmits the charge reset instruction signal supplied from the outside to each pixel generating unit. The transmission path Lc is common to all the pixel generating units included in the light receiving device.

The light receiving device having such a structure is supplied with instruction signals as follows. The common discharge instruction signal is supplied from the outside to the i-th pixel generating unit included in each pixel set via the transmission path La for the pixel generating unit, where i ranges from 1 to S. The common charge transfer instruction signal is supplied from the outside to the i-th pixel generating unit included in each pixel set via the transmission path Lb for the pixel generating unit, where i ranges from 1 to S. The common reset instruction signal is supplied from the outside to the pixel generating units included in the light receiving device via the transmission path Lc.

When the light receiving device is provided with the transmission paths La, Lb, and Lc common to the pixel sets, input terminals of the transmission paths La, Lb, and Lc are supplied with the discharge, charge transfer, and reset instruction signals common to the pixel sets. Just supplying the instruction signals can simultaneously perform the same operation on all the pixel sets. Accordingly, the light receiving device can simultaneously measure distances to a subject area corresponding to all the pixel sets with ease. The light receiving device can instantaneously detect a distance to the subject and generate optimal distance image data.

It will be obvious to those skilled in the art that various changes may be made in the above-described embodiments of the present invention. However, the scope of the present invention should be determined by the following claims.

What is claimed is:

1. An image data generating device comprising:
   a light emitting device configured to emit light;
   a light receiving device configured to receive incident light including the emitted light, which is reflected on a subject;
   a distance image data generation unit configured to find a distance to the subject by controlling the light emitting device and the light receiving device and generate distance image data representing the distance;
   a plane image data generation unit configured to control the light receiving device and generate plane image data representing a plane image of the subject; and
   an operation control unit configured to selectively operate the distance image data generation unit and the plane image data generation unit,
   wherein:
   the light receiving device includes an array of a plurality of pixel generating units, each of the pixel generating units including
      a single photoelectric conversion section for converting incident light into a charge and
      a single pixel output section corresponding one-to-one with the photoelectric conversion section,
      the pixel output section having a floating diffusion for accumulating a charge generated by the photoelectric conversion section,
      the pixel output section being (i) for discharging and discarding the generated charge in accordance with a discharge instruction signal supplied from an outside, (ii) for transferring the generated charge to the floating diffusion in accordance with a charge transfer instruction signal supplied from the outside, and (iii) for outputting a value equivalent to a charge accumulated in the floating diffusion;
   the distance image data generation unit further configured (i) to group the plurality of pixel generating units into multiple first sets of pixel generating units, (ii) to calculate a distance to the subject with respect to each first set of pixel generating units based on output values for the pixel generating units included in the each first set, and (iii) to represent a value corresponding to the calculated distance as a pixel value for a coordinate corresponding to the each first set of pixel generating units and generate the distance image data; and
   the plane image data generation unit further configured to describe a value corresponding to an output value for each of the pixel generating units as a pixel value for a coordinate corresponding to the each of the pixel generating units and generate the image data representing a plane image of the subject.

2. The image data generating device according to claim 1, wherein
   the distance image data generation unit is allowed to variably grouping the plurality of pixel generating units into multiple different sets to thereby change grouping of the plurality of pixel generating units from the first sets to the different sets.

3. The image data generating device according to claim 1, wherein:
   the distance image data generation unit is further configured to supply each pixel generating unit included in each first set with a discharge instruction signal and a transfer instruction signal so that the pixel generating units in the each first set output values equivalent to charges generated by the photoelectric conversion sections during different periods while receiving the reflected light resulting from the light emitted from the light emitting device; and
   the distance image data generation unit is further configured to control the light receiving device, find a phase difference between the incident light and the emitted light for the each first set based on the output values for the pixel generating units in the each first set, and calculates a distance to the subject with respect to the each first set.

4. The image data generating device according to claim 1, wherein:
   each first set of the multiple first sets includes four pixel generating units from first to fourth;

the distance image data generation unit controls the light emitting device to emit a pulsed light having a pulse width Tp;

each time the pulsed light is emitted, the distance image data generation unit controls the light receiving device such that (i) the first pixel generating unit allows a corresponding floating diffusion to accumulate a charge generated by a corresponding photoelectric conversion section during a time interval equivalent to the pulse width Tp from an emit start time for emitting the pulsed light, (ii) the second pixel generating unit allows a corresponding floating diffusion to accumulate a charge generated by a corresponding photoelectric conversion section during a time interval equivalent to the pulse width Tp after a delay of half the pulse width Tp (Tp/2) from the emit start time, (iii) the third pixel generating unit allows a corresponding floating diffusion to accumulate a charge generated by a corresponding photoelectric conversion section during a time interval equivalent to the pulse width Tp after a delay of the pulse width Tp from the emit start time, and (iv) the fourth pixel generating unit allows a corresponding floating diffusion to accumulate a charge generated by a corresponding photoelectric conversion section during a time interval equivalent to the pulse width Tp after a delay of three halves the pulse width Tp (3×Tp/2) from the emit start time; and the distance image data generation unit then calculates (i) a phase difference $\Phi$ based on output values V1, V2, V3, and V4 for the first, second, third, and fourth pixel generating units, respectively, using an equation of $\Phi=\arctan((V2-V4)/(V1-V3))$ and (ii) a distance D to the subject using an equation of $D=c \times Tp \times \Phi/(2\pi)$, wherein c denotes a light speed.

5. The image data generating device according to claim 1, wherein:

each first set of the multiple first sets includes four pixel generating units from first to fourth;

the distance image data generation unit controls the light emitting device to emit sine-modulated light that is amplitude-modulated by a sine wave;

the distance image data generation unit controls the light receiving device such that (i) the first pixel generating unit allows a corresponding floating diffusion to accumulate a charge generated by a corresponding photoelectric conversion section within a specified time interval around a reference time point that provides an initial phase to the sine-modulated light emitted from the light emitting device, (ii) the second pixel generating unit allows a corresponding floating diffusion to accumulate a charge generated by a corresponding photoelectric conversion section within a specified time interval around a time point by phase $\pi/2$ later than the reference time point, (iii) the third pixel generating unit allows a corresponding floating diffusion to accumulate a charge generated by a corresponding photoelectric conversion section within a specified time interval around a time point by phase $\pi$ later than the reference time point, and (iv) the fourth pixel generating unit allows a corresponding floating diffusion to accumulate a charge generated by a corresponding photoelectric conversion section within a specified time interval around a time point by phase $3\pi/2$ later than the reference time point; and the distance image data generation unit calculates a distance to the subject based on output values for the first to fourth pixel generating units with respect to the each first set.

6. The image data generating device according to claim 5, wherein the reference time point is where the sine-modulated light becomes phase zero; and the distance image data generation unit calculates (i) a phase difference $\Phi$ based on the output values V1, V2, V3, and V4 for the first, second, third, and fourth pixel generating units, respectively, using an equation of $\Phi=\arctan((V3-V1)/(V2-V4))$, and (ii) a distance D to the subject using an equation of $D=c \times (Tc/2) \times \Phi/(2\pi)$, where c denotes a light speed and Tc denotes a sine-modulated light cycle.

7. The image data generating device according to claim 1, wherein:

each first set of the multiple first sets includes equal to or more than three pixel generating units from first;

the distance image data generation unit allows the light emitting device to emit a pulsed light having a pulse width Tp;

each time the pulsed light is emitted, the distance image data generation unit controls the light receiving device such that (i) the first pixel generating unit allows a corresponding floating diffusion to accumulate a charge generated by a corresponding photoelectric conversion section during a time interval equivalent to the pulse width Tp from an emit start time for emitting the pulsed light, (ii) a second pixel generating unit allows a corresponding floating diffusion to accumulate a charge generated by a corresponding photoelectric conversion section during a time interval equivalent to the pulse width Tp after a delay of pulse width Tp from the emit start time, and (iii) another pixel generating unit other than the first and second pixel generating units in the each first set allows a corresponding floating diffusion to accumulate a charge generated by a corresponding photoelectric conversion section during a time interval while the light receiving device does not receive the reflected light corresponding to the light emitted from the light emitting device; and the distance image data generation unit then (i) finds values <V1> and <V2>, wherein <V1> denotes an output value V1 for the first pixel generating unit except a background light component based on an output value for the another pixel generating unit other than the first and second ones and <V2> denotes an output value V2 for the second pixel generating unit except the background light component and (ii) calculates a distance D to the subject using an equation of $D=(\frac{1}{2}) \times c \times Tp \times <V2>/(<V1>+<V2>)$, where c denotes a light speed.

8. The image data generating device according to claim 1, wherein each first set of the multiple first sets includes more than two pixel generating units from first;

the distance image data generation unit allows the light emitting device to emit pulsed light having pulse width Tp;

each time the pulsed light is emitted, the distance image data generation unit controls the light receiving device such that
- (i) the first pixel generating unit allows a corresponding floating diffusion to accumulate a charge generated by a corresponding photoelectric conversion section during a time interval equivalent to the pulse width Tp from an emit start time for emitting the pulsed light, and
- (ii) a second pixel generating unit allows a corresponding floating diffusion to accumulate a charge generated by a corresponding photoelectric conversion section during a time interval equivalent to the pulse width Tp after a delay of the pulse width Tp from the emit start time;

the distance image data generation unit then finds (i) a value <V1> denoting an output value V1 for the first pixel generating unit except a background light component and (ii) a value <V2> denoting an output value V2 for the second pixel generating unit except a background light component the distance image data generation unit calculates a distance D to the subject using an equation of D=(½)×c×Tp×<V2>/(<V1>+<V2>), where c denotes a light speed; and a cancel quantity setup unit is further comprised to provide the distance image data generation unit with a background light component for each of the first and second pixel generating units in the each first set based on an output value resulting from the each of the first and second pixel generation units.

9. The image data generating device according to claim 1, wherein:

the distance image generating unit is further configured to eliminate a background light component from an output value of each pixel generating unit, and calculates a distance to the subject based on the output value with the background light component eliminated; and a cancel quantity setup unit is further comprised to provide the distance image data generation unit with a background light component for each pixel generating unit in each first set based on an output value resulting from the each pixel generating unit.

10. The image data generating device according to claim 1, wherein:

a number of the pixel generation units in each first set is S; and the distance image data generating unit controls the light receiving device so that pixel generating units in the first sets are supplied with a discharge instruction signal and a charge transfer instruction signal such that
- (i) i-th pixel generating units, wherein i ranges from one to S, in the multiple first sets simultaneously perform identical operations, and
- (ii) the pixel generating units including from the first to the S-th in the each first set output values corresponding to charges generated by corresponding photoelectric conversion sections during different time periods while receiving the reflected light resulting from the light emitted from the light emitting device.

11. The image data generating device according to claim 1, wherein:

a number of the pixel generation units in each first set is S;

a transmission path La is comprised to transmit a discharge instruction signal supplied from the outside to each i-th pixel generating units, wherein i ranges from one to S in the multiple first sets, the transmission path La being common to the each i-th pixel generating units included in the multiple first sets;

a transmission path Lb is comprised to transmit a charge transfer instruction signal supplied from the outside to each i-th pixel generating units in the multiple first sets, the transmission path Lb being common to the each i-th pixel generating units included in the multiple first sets;

the distance image generation unit is configured to supply a common discharge instruction signal to the i-th pixel generating units in the multiple first sets via the transmission path La for the i-th pixel generating units; and the distance image generation unit is configured to supply a common charge transfer instruction signal to the i-th pixel generating units in the multiple first sets via the transmission path Lb for the i-th pixel generating units.

12. The image data generating device according to claim 1, wherein:

the distance image data, which is generated with respect to each first set of pixel generating units, is defined as data of a standard mode;

the distance image data generation unit is further configured to (i) collect several first sets to form multiple large sets of pixel generating units, each large set including pixel generating units more than the each first set does, (ii) calculate a distance to the subject with respect to each large set of pixel generating units based on output values of the pixel generating units included in the each large set, and (iii) represent a value corresponding to the calculated distance as a pixel value for a coordinate corresponding to the each large set of pixel generating units and generate the distance image data, which is defined as data of a low resolution mode; and the distance image data generation unit is further configured to select either the standard mode or the low resolution mode.

13. The image data generating device according to claim 12, wherein a number of the pixel generation units in each first set is S;

the distance image data generating unit controls the light receiving device so that pixel generating units in the first sets are supplied with a discharge instruction signal and a charge transfer instruction signal such that
- (i) i-th pixel generating units, wherein i ranges from one to S, in the multiple first sets simultaneously perform identical operations, and
- (ii) the pixel generating units including from the first to the S-th in the each first set output values corresponding to charges generated by corresponding photoelectric conversion sections during different time periods while receiving the reflected light resulting from the light emitted from the light emitting device;

in the standard mode, the distance image data generation unit finds a phase difference between the incident light and the emitted light from the light emitting device for each first set based on output values for pixel generating units included in the each first set and calculates a distance to the subject; and in the low resolution mode, the distance image data generation unit (i) accumulates output values for i-th pixel generating units in the large set and acquires integrated values for the i-th pixel generating units, (ii) calculates a distance to the subject based on the integrated values for the first through the S-th pixel generating units in the large set, and (iii) represents a value corresponding to the calculated distance as a pixel value for a coordinate corresponding to the large set and generates distance image data.

14. The image data generating device according to claim 1, wherein
the distance image data, which is generated with respect to each first set of pixel generating units, is defined as data of a standard mode;
the distance image data generation unit is configured to (i) divide each fist set into multiple small sets of pixel generating units, each small set including pixel generating units less than the each first set does, (ii) calculate a distance to the subject with respect to each small set of pixel generating units based on output values of the pixel generating units included in the each small set, and (iii) represent a value corresponding to the calculated distance as a pixel value for a coordinate corresponding to the each small set of pixel generating units and generate the distance image data, which is defined as data of a high resolution mode; and
the distance image data generation unit is further configured to select either the standard mode or the high resolution mode.

15. The image data generating device according to claim 12, wherein
the light receiving device contains the pixel generating units laid out in a matrix of (K×M) rows and (L×N) columns; and
the multiple first sets are laid in a matrix of K×L while each first set contains pixel generating units of M rows and N columns.

16. The image data generating device according to claim 1, wherein
the light receiving device contains the pixel generating units laid out in a matrix of (K×M) rows and (L×N) columns;
the multiple first sets are laid in a matrix of K×L while each first set contains pixel generating units of M rows and N columns;
the distance image data generation unit is further configured to calculate a distance to the subject based on output values for the pixel generating units in a certain first set included in the multiple first sets of pixel generation units;
the certain first set is assumed to be a center area of M rows and N columns;
another first set of pixel generating units is assumed as an area of M rows and N columns shifted by $\Delta m$ rows from the center area, where $\Delta m$ is smaller than value M;
still another first set of pixel generating units is assumed as an area of M rows and N columns shifted by $\Delta n$ columns from the center area, where $\Delta n$ is smaller than value N;
yet another first set of pixel generating units is assumed as an area of M rows and N columns shifted by $\Delta m$ rows and $\Delta n$ columns from the center area;
the distance image data generation unit is further configured to calculate a distance to the subject based on output values for the pixel generating units in part or all of peripheral first sets including the another first set, the still another first set, and the yet another first set;
the distance image data generation unit is further configured to correct the distance acquired from the certain first set of pixel generating units in the center area based on a result of calculating distances from the peripheral first sets of pixel generating units around the center area; and
the distance image data generation unit is further configured to represent a value corresponding to the corrected distance as a pixel value for a coordinate corresponding to the certain first set of pixel generating units in the center area and generate distance image data.

* * * * *